US008396838B2

(12) United States Patent
Brockway et al.

(10) Patent No.: US 8,396,838 B2
(45) Date of Patent: Mar. 12, 2013

(54) LEGAL COMPLIANCE, ELECTRONIC DISCOVERY AND ELECTRONIC DOCUMENT HANDLING OF ONLINE AND OFFLINE COPIES OF DATA

(75) Inventors: Brian Brockway, Shrewsbury, NJ (US); Alan Bunte, Monmouth Beach, NJ (US); Christie J. Van Wagoner, Colts Neck, NJ (US); Simon Taylor, Colts Neck, NJ (US); Marcus S. Muller, Cranbury, NJ (US); Anand Prahlad, Banglore (IN); Randy DeMeno, Staten Island, NY (US); Rammohan G. Reddy, Thornton, CO (US)

(73) Assignee: CommVault Systems, Inc., Oceanport, NJ (US)

( * ) Notice: Subject to any disclaimer, the term of this patent is extended or adjusted under 35 U.S.C. 154(b) by 188 days.

(21) Appl. No.: 12/876,916

(22) Filed: Sep. 7, 2010
(Under 37 CFR 1.47)

(65) Prior Publication Data

US 2011/0093471 A1   Apr. 21, 2011

Related U.S. Application Data

(63) Continuation-in-part of application No. 11/874,122, filed on Oct. 17, 2007, now Pat. No. 7,792,789, and a continuation-in-part of application No. 11/950,376, filed on Dec. 4, 2007, now Pat. No. 8,140,786.

(60) Provisional application No. 61/243,867, filed on Sep. 18, 2009.

(51) Int. Cl.
*G06F 7/00* (2006.01)
*G06F 17/00* (2006.01)

(52) U.S. Cl. ........................ 707/662; 707/665

(58) Field of Classification Search .................. 707/608, 707/665, 662
See application file for complete search history.

(56) References Cited

U.S. PATENT DOCUMENTS

| 4,464,122 A | 8/1984 | Fuller et al. |
| 4,686,620 A | 8/1987 | Ng |

(Continued)

FOREIGN PATENT DOCUMENTS

| EP | 0259912 A1 | 3/1988 |
| EP | 0405926 A2 | 1/1991 |

(Continued)

OTHER PUBLICATIONS

Armstead et al., "Implementation of a Campus-wide Distributed Mass Storage Service: The Dream vs. Reality," IEEE, 1995, pp. 190-199.

(Continued)

*Primary Examiner* — James Trujillo
*Assistant Examiner* — Pavan Mamillapalli
(74) *Attorney, Agent, or Firm* — Perkins Coie LLP

(57) ABSTRACT

Systems and methods of electronic document handling permit organizations to comply with legal or regulatory requirements, electronic discovery and legal hold requirements, and/or other business requirements. The systems described provide a unified approach to data management that enables compliance, legal and IT personnel to focus efforts on, e.g., a single data repository. The systems permit users to define and utilize information governance policies that help automate and systematize different compliance tasks. In some examples, organizations may push data in any third-party data format to the systems described herein. The systems may permit compliance or IT personnel to detect when a legally sensitive production file has been changed or deleted. The systems may also provide a unified dashboard user interface. From a dashboard interface, users may perform searches, participate in collaborative data management workflows, obtain data management reports, and adjust policies. Other elements and features are disclosed herein.

20 Claims, 30 Drawing Sheets

U.S. PATENT DOCUMENTS

| | | | |
|---|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsiao et al. |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 * | 10/2001 | Lang et al. .................... 707/608 |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,341,287 B1 * | 1/2002 | Sziklai et al. .......... 707/999.102 |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,678 B2 * | 7/2002 | Smiga et al. .................. 707/608 |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,675,177 B1 | 1/2004 | Webb |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |
| 6,745,178 B1 | 6/2004 | Emens et al. |
| 6,795,828 B2 | 9/2004 | Ricketts |
| 6,816,941 B1 | 11/2004 | Carlson et al. |
| 6,820,070 B2 | 11/2004 | Goldman et al. |
| 6,839,741 B1 | 1/2005 | Tsai |
| 6,839,803 B1 | 1/2005 | Loh et al. |
| 6,850,994 B2 | 2/2005 | Gabryjelski |
| 6,860,422 B2 * | 3/2005 | Hull et al. ..................... 235/376 |
| 6,871,182 B1 | 3/2005 | Winnard et al. |
| 6,892,221 B2 | 5/2005 | Ricart et al. |
| 6,948,038 B2 | 9/2005 | Berkowitz et al. |
| 6,957,186 B1 | 10/2005 | Guheen et al. |
| 6,970,997 B2 | 11/2005 | Shibayama et al. |
| 6,976,039 B2 | 12/2005 | Chefalas et al. |
| 6,995,675 B2 | 2/2006 | Curkendall et al. |
| 6,996,616 B1 | 2/2006 | Leighton et al. |
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad et al. |
| 7,058,661 B2 | 6/2006 | Ciaramitaro et al. |
| 7,099,901 B2 | 8/2006 | Sutoh et al. |
| 7,107,298 B2 * | 9/2006 | Prahlad et al. ................ 707/640 |

| | | |
|---|---|---|
| 7,139,826 B2 | 11/2006 | Watanabe et al. |
| 7,146,387 B1 | 12/2006 | Russo et al. |
| 7,155,421 B1 | 12/2006 | Haldar |
| 7,155,481 B2 | 12/2006 | Prahlad et al. |
| 7,159,081 B2 | 1/2007 | Suzuki |
| 7,171,468 B2 | 1/2007 | Yeung et al. |
| 7,171,585 B2 | 1/2007 | Gail et al. |
| 7,188,141 B2 | 3/2007 | Novaes |
| 7,240,100 B1 | 7/2007 | Wein et al. |
| 7,246,207 B2 | 7/2007 | Kottomtharayil et al. |
| 7,269,664 B2 | 9/2007 | Hutsch et al. |
| 7,284,033 B2 | 10/2007 | Jhanji |
| 7,287,047 B2 | 10/2007 | Kavuri |
| 7,290,017 B1 | 10/2007 | Wang et al. |
| 7,313,659 B2 | 12/2007 | Suzuki |
| 7,346,623 B2 | 3/2008 | Prahlad et al. |
| 7,346,676 B1 | 3/2008 | Swildens et al. |
| 7,346,751 B2 | 3/2008 | Prahlad et al. |
| 7,376,947 B2 | 5/2008 | Evers |
| 7,379,978 B2 | 5/2008 | Anderson et al. |
| 7,386,535 B1 | 6/2008 | Kalucha et al. |
| 7,395,282 B1 | 7/2008 | Crescenti et al. |
| 7,424,543 B2 | 9/2008 | Rice, III |
| 7,434,219 B2 | 10/2008 | De Meno et al. |
| 7,457,790 B2 | 11/2008 | Kochunni et al. |
| 7,472,142 B2 | 12/2008 | Prahlad et al. |
| 7,496,841 B2 | 2/2009 | Hadfield et al. |
| 7,565,484 B2 | 7/2009 | Ghosal et al. |
| 7,577,689 B1 * | 8/2009 | Masinter et al. ........ 707/999.204 |
| 7,577,694 B2 | 8/2009 | Nakano et al. |
| 7,584,469 B2 | 9/2009 | Mitekura et al. |
| 7,587,715 B1 | 9/2009 | Barrett et al. |
| 7,593,935 B2 | 9/2009 | Sullivan |
| 7,596,713 B2 | 9/2009 | Mani-Meitav et al. |
| 7,603,626 B2 | 10/2009 | Williams et al. |
| 7,606,844 B2 | 10/2009 | Kottomtharayil |
| 7,610,285 B1 * | 10/2009 | Zoellner et al. ........ 707/999.007 |
| 7,668,884 B2 | 2/2010 | Prahlad et al. |
| 7,676,542 B2 | 3/2010 | Moser et al. |
| 7,689,899 B2 | 3/2010 | Leymaster et al. |
| 7,730,031 B2 | 6/2010 | Forster |
| 7,734,593 B2 | 6/2010 | Prahlad et al. |
| 7,734,669 B2 | 6/2010 | Kottomtharayil et al. |
| 7,751,628 B1 | 7/2010 | Reisman |
| 7,761,409 B2 * | 7/2010 | Stefik et al. ................ 707/608 |
| 7,792,789 B2 | 9/2010 | Prahlad et al. |
| 7,814,118 B2 | 10/2010 | Kottomtharayil et al. |
| 7,831,793 B2 | 11/2010 | Chakravarty et al. |
| 7,840,537 B2 | 11/2010 | Gokhale et al. |
| 7,844,676 B2 | 11/2010 | Prahlad et al. |
| 7,865,517 B2 | 1/2011 | Prahlad et al. |
| 7,882,093 B2 | 2/2011 | Kottomtharayil et al. |
| 7,937,420 B2 | 5/2011 | Tabellion et al. |
| 7,937,702 B2 | 5/2011 | De Meno et al. |
| 7,984,063 B2 | 7/2011 | Kottomtharayil et al. |
| 8,055,627 B2 | 11/2011 | Prahlad et al. |
| 2002/0032878 A1 | 3/2002 | Karpf |
| 2002/0049883 A1 | 4/2002 | Schneider et al. |
| 2003/0050979 A1 | 3/2003 | Takahashi |
| 2003/0101086 A1 | 5/2003 | San Miguel |
| 2004/0039689 A1 * | 2/2004 | Penney et al. .................. 705/38 |
| 2005/0039069 A1 | 2/2005 | Prahlad et al. |
| 2005/0055519 A1 * | 3/2005 | Stuart et al. .................. 711/159 |
| 2005/0097070 A1 | 5/2005 | Enis et al. |
| 2005/0251786 A1 | 11/2005 | Citron et al. |
| 2005/0278207 A1 | 12/2005 | Ronnewinkel |
| 2006/0036619 A1 | 2/2006 | Fuerst et al. |
| 2006/0070061 A1 | 3/2006 | Cox et al. |
| 2006/0115802 A1 | 6/2006 | Reynolds |
| 2006/0116999 A1 | 6/2006 | Dettinger et al. |
| 2006/0149604 A1 | 7/2006 | Miller |
| 2006/0149724 A1 | 7/2006 | Ritter et al. |
| 2006/0224846 A1 | 10/2006 | Amarendran et al. |
| 2007/0022145 A1 | 1/2007 | Kavuri |
| 2007/0028229 A1 | 2/2007 | Knatcher |
| 2007/0038857 A1 * | 2/2007 | Gosnell ......................... 713/165 |
| 2007/0043715 A1 | 2/2007 | Kaushik et al. |
| 2007/0166674 A1 | 7/2007 | Kochunni et al. |
| 2007/0250810 A1 | 10/2007 | Tittizer et al. |
| 2008/0091655 A1 | 4/2008 | Gokhale et al. |
| 2008/0229037 A1 | 9/2008 | Bunte et al. |
| 2008/0243855 A1 | 10/2008 | Prahlad et al. |
| 2008/0243958 A1 | 10/2008 | Prahlad et al. |
| 2008/0320319 A1 | 12/2008 | Muller et al. |
| 2009/0171883 A1 | 7/2009 | Kochunni et al. |
| 2009/0177719 A1 | 7/2009 | Kavuri |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320033 A1 | 12/2009 | Gokhale et al. |
| 2009/0320037 A1 | 12/2009 | Gokhale et al. |
| 2010/0031017 A1 | 2/2010 | Gokhale et al. |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0076932 A1 | 3/2010 | Lad |
| 2010/0114837 A1 | 5/2010 | Prahlad et al. |
| 2011/0173171 A1 | 7/2011 | De Meno et al. |
| 2011/0173207 A1 | 7/2011 | Kottomtharayil et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0910019 | 4/1999 |
| EP | 0981090 A1 | 2/2000 |
| EP | 0986011 | 3/2000 |
| GB | 2216368 A | 10/1989 |
| JP | 07-046271 A | 2/1995 |
| JP | 7073080 A | 3/1995 |
| JP | 8044598 A | 2/1996 |
| JP | 2000035969 | 2/2000 |
| JP | 2003531435 | 10/2003 |
| WO | WO-9513580 A1 | 5/1995 |
| WO | WO-9912098 A1 | 3/1999 |
| WO | WO-00/58865 | 10/2000 |
| WO | WO-01/06368 | 1/2001 |
| WO | WO-01/16693 | 3/2001 |
| WO | WO-0180005 | 10/2001 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," *IEEE*, 1994, pp. 124-126.
Jander, M., "Launching Storage-Area Net," *Data Communications*, US, McGraw Hill, NY, vol. 27, No. 4 (Mar. 21, 1998), pp. 64-72.
Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).
Rosenblum et al., "The Design and Implementation of a Log-Structured File System," *Operating Systems Review SIGOPS*, vol. 25, No. 5, New York, US, pp. 1-15 (May 1991).
U.S. Appl. No. 09/609,977.
U.S. Appl. No. 13/076,792, filed Mar. 21, 2011.
U.S. Appl. No. 13/250,349, filed Sep. 30, 2011.
U.S. Appl. No. 13/343,034, filed Jan. 4, 2012.
Microsoft Press Computer Dictionary Third Edition, "Data Compression," Microsoft Press, 1997, p. 130.
Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.
Hennessy et al., "Computer Architecture—A Quantitative Approach", 2nd Edition, 1996, pp. 246-250.

* cited by examiner

| Chain of Custody Report | | | | | | | | |
|---|---|---|---|---|---|---|---|---|
| Item # | Item size | Item Created Date/Time | Item last Modified Date/Time | Item Location | Custodians | Item Ingestion Job - ID | Item Ingestion Application Type | Ingestion Job Completion Date/Time |
| 1 | 10 KB | 02/11/2004 11:21:43 PM | 02/13/2007 01:03:51 AM | mid:030207.65423@mail.bar.com | AZ/asinha (Amit Sinha) | 124 | Exchange Public Folder | 02/13/2008 03:17:49AM |
| 2 | 28 KB | 07/11/2005 10:29:43 PM | 02/13/2007 01:03:51 AM | file://server.bar.com/ C:/My%20Directory/ somefile.pdf | OP/bcollom (Bryan Collum) | 198 | Windows 2003 64-bit File System | 03/01/2009 03:17:49AM |
| 3 | 13 KB | 07/15/1997 06:28:34 PM | 07/15/1997 06:28:34 PM | mid:040211.65423@ mail.bar.com/attach1. 040211.65423@mail. bar.com | CVDEMO/ mrutty (Michael Rutty) | 210 | Exchange 2000 Mailbox Archiver | 11/14/2005 11:01:49AM |

*FIG. 11A*

Chain of Custody Report

| Item # | Dynamic teaser – lists the most relevant scored search terms from the original search – | Tags Assigned to Items | Query Keywords | Query Performed by (User Name) | Query Performed on (Host Name) | Date/Time Query Performed |
|---|---|---|---|---|---|---|
| 1 | CommVault Source \<b>Project\</b> \<b>Tree\</b> HTML JAVA GUI SunOS Solaris HPUX Installation include_UNIX ?\<b>Projects\</b>? Libraries src UNIX installation...common informix Brower JAVA NonCV \<b>CV\</b>_Top Bold text represents \<b>CV\</b>_Top Bold text represents \<b>projects\</b> and regular text represents directions... | SPAM,Un-Reviewed,Client-Attorney Privileged, Appraised | Stock AND bonds | AZ/asinha (Amit Sinha) | 172.19.156.227 (qhost.myorg.com) | 03/13/2009 11:09:22 PM |
| 2 | CommVault Source \<b>Project\</b> \<b>Tree\</b> HTML JAVA GUI SunOS Solaris HPUX Installation include_UNIX ?\<b>Projects\</b>? Libraries src UNIX installation...common informix Brower JAVA NonCV \<b>CV\</b>_Top Bold text represents \<b>CV\</b>_Top Bold text represents \<b>projects\</b> and regular text represents directions... | SPAM,Un-Reviewed,Client-Attorney Privileged, Appraised | lie OR cheat OR steal | AZ/asinha (Amit Sinha) | 172.19.156.227 (qhost.myorg.com) | 01/02/2009 11:09:22 PM |
| 3 | CommVault Source \<b>Project\</b> \<b>Tree\</b> HTML JAVA GUI SunOS Solaris HPUX Installation include_UNIX ?\<b>Projects\</b>? Libraries src UNIX installation...common informix Brower JAVA NonCV \<b>CV\</b>_Top Bold text represents \<b>CV\</b>_Top Bold text represents \<b>projects\</b> and regular text represents directions... | SPAM, Un-Reviewed, Questioned,Client-Attorney Privilege | Stock AND bonds | AZ/asinha (Amit Sinha) | 172.19.156.227 (qhost.myorg.com) | 03/13/2009 11:09:22 PM |

*FIG. 11B*

Chain of Custody Report

| Item # | Export Job Completion Date/Time | Export Location | Export Restore Job-ID |
|---|---|---|---|
| 1 | 04/01/2009 09:04:19AM | file://fileserver/d:/Program%20Files/CommVaIut/Simpana/iDataAgent/JobResults/DM2CacheDir/02f27e47-c3a5-4ea6-b13a-9fa6echaf310.pst#maplid=00000000AEE02E2E87CA2B4C9FAD73ES0670546744002010 | 721 |
| 2 | 04/02/2009 10:44:21AM | file://fileserver/d:/Program%20Files/CommVaIut/Simpana/iDataAgent/JobResults/DM2CacheDir/38127e47-bab54ea6-b13a-9fa6ecb87102.cab#somefile.pdf | 247 |
| 3 | 04/01/2009 09:04:19AM | file://fileserver/d:/Program%20Files/CommVaIut/Simpana/iDataAgent/JobResults/DM2CacheDir/02f27e47-c3a5-4ea6-b13a-9fa6echaf310.pst#maplid=00000000AEE02E2E87CA2B4C9FAD73ES0670546744002011 | 721 |

*FIG. 11C*

Advanced Search

| Select Option / Filter ◀ | Entities ☒ | | | |
|---|---|---|---|---|
| Client | | | Group Operator: | OR ▼ |
| Common | Entities Criteria | | AND ▼ Add Group Remove Group | ➕ |
| Discovery | | | | |
| Email | SSN | ▼ | Input criteria for the field: SSN | None ▼ |
| Entities | Driving License Num | ▼ | Input criteria for the field: Driving License Number | None ▼ 🗑 |
| File | American CC | ▼ | Input criteria for the field: American CC | None ▼ 🗑 |
| Search Options | VISA CC | ▼ | Input criteria for the field: VISA CC | None ▼ 🗑 |
| Summary | MasterCard CC | ▼ | Input criteria for the field: MasterCard CC | None ▼ 🗑 |
| | Discover CC | ▼ | Input criteria for the field: Discover CC | None ▼ 🗑 |
| | Location | ▼ | Input criteria for the field: Location | None ▼ 🗑 |
| | Routing Number | ▼ | Input criteria for the field: Routing Number | None ▼ 🗑 |
| | US Phone Number | ▼ | Input criteria for the field: US Phone Number | None ▼ 🗑 |

*FIG. 14*

Advanced Search

Select Option / Filter ◀ | Email ☒

| | | | Group Operator: AND ▼ |
|---|---|---|---|
| Client | Email Criteria | | |
| Common | | | OR ▼ Add Group Remove Group ⊕ |
| Discovery | BCC ▼ | Input criteria for the field: BCC | OR ▼ 🗑 |
| Email | CC ▼ | Input criteria for the field: CC | None ▼ 🗑 |
| Entities | Received Time ▼ | Select Start Date for the field: Recei 📅 Select End Date for the field: Recei 📅 | OR ▼ 🗑 |
| File | To ▼ | Input criteria for the field: To | OR ▼ 🗑 |
| Search Options | Subject ▼ | Input criteria for the field: Subjectc | OR ▼ 🗑 |
| Summary | Attachement Name ▼ | Input criteria for the field: Attachement Name | OR ▼ 🗑 |
| | Email Address ▼ | Input criteria for the field: Email Address | OR ▼ 🗑 |
| | From ▼ | Input criteria for the field: From | |

$Files$
$Name/Pattern$
$Size$
$Any$
$Folder$
$Modified Date$
$Any$

FIG. 26

$Mails$
$Subject$
$From$
$To$
$Cc$
$Bcc$
$Attachments$
$Email Addresses$
$Received Time$
$Any$ $Advanced Options$ $Clients$ $Client Groups$ $Data Agents$
$All$;

$Search for data owned by (eg: Domain\User)$ $Search for data owned by group (eg: Domain\Group)$ ☐ $Expand Group$ $Search for data accessible by (eg: Domain\User)$ $Sort by OR Group by$
$Size$ $Sample Every$
1   $Results$ Tags $Backup Time$
$Any$ $Time Zone$
(GMT-05:00) Eastern Time (US & Canada)

$Language$
English

*FIG. 27*

LEGAL COMPLIANCE, ELECTRONIC DISCOVERY AND ELECTRONIC DOCUMENT HANDLING OF ONLINE AND OFFLINE COPIES OF DATA

CROSS-REFERENCE TO RELATED APPLICATION(S)

This application is a continuation-in-part of U.S. patent application Ser. No. 11/874,122, filed on Oct. 17, 2007, entitled "METHOD AND SYSTEM FOR COLLABORATIVE SEARCHING", now U.S. Pat. No. 7,792,789 and U.S. patent application Ser. No. 11/950,376, filed on Dec. 4, 2007 now U.S. Pat. No. 8,140,789, entitled "SYSTEMS AND METHODS FOR CREATING COPIES OF DATA, SUCH AS ARCHIVE COPIES", now U.S. Patent Publication No. 2008-0229037; this application also claims the benefit of U.S. Patent Application No. 61/243,867, filed on Sep. 18, 2009, entitled "LEGAL COMPLIANCE, ELECTRONIC DISCOVERY AND ELECTRONIC DOCUMENT HANDLING FOR COPIES OF DATA, SUCH AS ARCHIVE COPIES WITHIN A DATA STORAGE NETWORK"; each of these applications is hereby incorporated herein in its entirety.

BACKGROUND

Corporations and other organizations routinely copy data produced and/or stored by their computer systems in order to provide additional protection for the data, to comply with regulatory requirements, or for other business reasons. For example, a company might retain data from computing systems related to e-commerce, such as databases, file servers, web servers, and so on. The company may also retain data from computing systems used by employees, such as those used by an accounting department, marketing department, engineering, and so on. The data may include, for example, personal data, financial data, customer/client/patient data, audio/visual data, textual data, and other types of data. Organizations may also retain data related to the correct operation of their computer systems, such as operating system files, application files, user settings, and so on.

Current storage management systems employ a number of different methods to retain and archive data. For example, data can be stored in primary storage as a primary copy that includes production data, or in secondary storage as various types of secondary copies including, as a recovery copy, continuous data protection ("CDP") copy, backup copy, a snapshot copy, a hierarchical storage management copy ("HSM"), an archive copy, and other types of secondary copies.

A primary, or active, copy of data is generally a production copy or other "live" version of the data which is used by a software application and is generally in the native format of that application. Primary copy data may be maintained in a local memory, disk, or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurs with the data stored in primary storage.

Secondary, or passive, copies include point-in-time data and are typically intended for longer-term retention (e.g., weeks, months or years depending on retention criteria, for example as specified in a storage policy or other policies as further described herein) before some or all of the data is moved to other storage or discarded. Secondary copies may be indexed so users can browse, search and restore the data at another point in time. A secondary copy may be stored on disk, tape, or other types of media. After certain primary copy data is backed up, a pointer or other location indicia such as a stub may be placed in the primary copy to indicate the current location of that data. Further details may be found in the assignee's U.S. Pat. No. 7,107,298, filed Sep. 30, 2002, entitled SYSTEM AND METHOD FOR ARCHIVING OBJECTS IN AN INFORMATION STORE.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

Another form of secondary copy is a snapshot copy. From an end-user viewpoint, a snapshot may be thought as an instant image of the primary copy data at a given point in time. A snapshot may capture the directory structure of a primary copy volume at a particular moment in time, and may also preserve file attributes and contents. In some embodiments, a snapshot may exist as a virtual file system, parallel to the actual file system. Users may gain a read-only access to the record of files and directories of the snapshot. By electing to restore primary copy data from a snapshot taken at a given point in time, users may also return the current file system to the prior state of the file system that existed when the snapshot was taken.

A snapshot may be created nearly instantly, using a minimum of file space, but may still function as a conventional file system backup. A snapshot may not actually create another physical copy of all the data, but may simply create a table of pointers that are able to map files and directories to specific disk blocks. The table of pointers may indicate which blocks are unchanged, and if a block has changed, the table may point to a location where the previous, unchanged version of the block has been stored (copy-on-write).

An HSM copy is generally a copy of the primary copy data, but typically includes only a subset of the primary copy data that meets a certain criteria and is usually stored in a format other than the native application format (e.g., compressed, deduplicated, and converted to a generic format). For example, an HSM copy might include only that data from the primary copy that is larger than a given size threshold or older than a given age threshold and that is stored in a backup format. Often, HSM data is removed from the primary copy, and a stub is stored in the primary copy to indicate its new location. When a user requests access to the HSM data that has been removed or migrated, systems use the stub to locate the data and often make recovery of the data appear transparent even though the HSM data may be stored at a location different from the remaining primary copy data.

An archive copy is generally similar to an HSM copy, however, the data satisfying criteria for removal from the primary copy is generally completely removed with no stub left in the primary copy to indicate the new location (i.e., where it has been moved to). Archive copies of data are generally stored in a backup format or other non-native application format. In addition, archive copies are generally retained for very long periods of time (e.g., years) and in some cases are never deleted. Such archive copies may be made and kept for extended periods in order to meet compliance regulations or for other permanent storage applications.

Typical data storage systems create a first secondary backup copy from a production copy for short term data recovery and after a certain time send a copy to an archive for long term storage, e.g., to comply with regulatory retention requirements. Thus, organizations are storing large amounts of data in their data archives at great expense.

A copy of data may be "online" or "offline" with respect to an organization. An online copy is a copy whose entire contents are readily accessible over the organization's network, without the need for physically recalling or retrieving physical storage media that stores the copy, e.g., from an off-site location, and without the need for manual physical human intervention. An online copy may include, for example, a production copy stored on the organization's mail server, a snapshot copy stored on magnetic storage media that is connected to the organization's storage area network, an archive copy stored on a cloud storage site that is accessible by the organization's network, and a backup copy stored on a tape that is managed by a tape autoloader in the organization's tape library. An offline copy is one whose entire contents are not readily accessible over an organization's network because the physical storage media that stores the copy must be physically re-called or retrieved, e.g., from an off-site location, or because human intervention is required to retrieve the copy. An example of an offline copy is an archive copy that has been stored on tape media that has been sent to a secure offsite location. In such an example, in order to access the entire contents of the archive copy, the tape copy must be retrieved from the offsite location (e.g., via a physical shipment from the off-site location) and then the tape must be re-loaded into an on-site tape library. Another example of an offline copy is a secondary copy stored on a USB flash memory device that an employee has stored in her desk drawer. In such a scenario, the employee must physically re-connect the USB memory device to her computer before it will be accessible over the organization's network.

Companies are often required to retain documents in archive files and/or implement various data management tasks in order to comply with various data regulations and avoid enforcement actions. For example, when a company is in litigation, the company may be required to retain documents related to the litigation. Employees are often asked not to delete any correspondence, emails, or other documents related to the subject matter of the litigation. Recently enacted amendments to Federal Rules of Civil Procedure (FRCP) place additional document retention burdens on a company. According to Gartner, "Several legal commentators believe that the heart of the proposed changes to FRCP is the formal codification of "electronically stored information" (ESI) and the recognition that the traditional discovery framework dealing with paper-based documents is no longer adequate." Legal discovery of electronic information has emerged as a key requirement for today's enterprise in recent years, and the new federal rules both strengthen and expand those requirements.

As another example, regulatory authorities all over the world are intensifying the monitoring and enforcement of specific electronic recordkeeping requirements. Such enforcement may relate to EU Data Protection, EU Data Privacy, Environmental Protection Act, Employment Act, Health & Safety Executive, enforcement in relation to standards including the British Standards Institution (BSI) BIP 0008, ISO/IEC 17799, ISO 15489, BS 7799, ISO 9000, as well as specific legislation on company records and anti-terrorism. There are also other concerns for organizations that must comply with U.S.-specific legislation such as the Sarbanes-Oxley Act, SEC Rule 17a-4, NASD 3110 and 3111, Health Information Technology for Economic and Clinical Health Act (HITECH) & Health Insurance Portability and Accountability Act (HIPAA) 1996, Obstruct Terrorism Act of 2001, Gramm-Leach-Bliley Act (GLBA), Financial Institution Privacy Protection Act of 2001 and the Financial Institution Privacy Protection Act of 2003. For federal, government and military institutions, compliance means conforming to the retention schemas and guidelines imposed by records management authorities, the recommendations of national archives or specific record statutes. For example, the US Department of Defense records-keeping requirements DoD 5015.2 and DoD 8320.02 impose a formal taxonomy, where compliance is about aligning records to specific retention and disposition policies based on the way they are classified and assigned metadata. European local government classification schemas, including the UK LGCS, as well as countless local US state classification models offer guidelines for the management of paper and electronic, structured and unstructured information records.

In summary, a single organization may be subject to several data-management regulations, each of which may:
  relate to a different subset of the organization's data (e.g., financial records versus patient records),
  require different data retention and security schemes (e.g., seven years of encrypted off-site archival storage versus indefinite storage on local fast media),
  impose different roles and responsibilities on an organization's IT, compliance, and/or legal personnel (e.g., pro-active and ongoing review versus regular annual reporting versus reactive on-demand review and reporting), and,
  require different outcomes (e.g., the production of a dedicated litigation archive file versus a compliance report).

It may prove difficult for an organization to comply with all of the myriad regulations related to document retention, particularly when many employees may have relevant documents stored under their control that are subject to regulation. Penalties for violation of data regulations can be steep, and executives and business managers want confidence that employees are taking appropriate steps to comply with the regulations. Employees may forget about requests to retain documents, or may not think that a particular document is relevant when others would disagree.

In order to comply with regulations, companies also need provisions for finding retained documents. Traditional search engines accept a search query from a user, and generate a list of search results. The user typically views one or two of the results and then discards the results. However, some queries are part of a longer-term, collaborative process. For example, when a company receives a legal discovery request or other type of compliance request, the company is often required to mine all of the company's data for documents responsive to the request. This typically involves queries of different bodies of documents lasting days or even years. Many people are often part of the query, such as company employees, law firm associates, and law firm partners. The search results must often be viewed by more than one of these people in a well-defined set of steps (i.e., a workflow). For example, company employees may provide documents to a law firm, and associates at the law firm may perform an initial reading of the documents to determine if the documents contain relevant information. The associates may flag documents with descriptive classifications such as "relevant" or "privileged." Then, the flagged documents may go to a law firm partner who will review each of the results and ultimately respond to the compliance request with the set of documents that satisfies the request.

Some regulations might also require that a query be applied on an ongoing basis to new data as it is created within an organization. For example, when subject to a legal discovery request, a company might be required to continue to mine new emails as they are created to determine if they are responsive to the discovery request. In such a scenario, the company may need to then direct any new responsive emails into the workflow described above. As another example, an organization might be required to continuously monitor its officer's correspondence and documents for indications of insider trading.

Collaborative document management systems exist for allowing multiple users to participate in the creation and revision of content, such as documents. Many collaborative document management systems provide an intuitive user interface that acts as a gathering place for collaborative participants. For example, Microsoft Sharepoint Server provides a web portal front end that allows collaborative participants to find shared content and to participate in the creation of new content and the revision of content created by others. In addition to directly modifying the content of a document, collaborative participants can add supplemental information, such as comments to the document. Many collaborative document management systems also provide workflows for defining sets of steps to be completed by one or more collaborative participants. For example, a collaborative document management system may provide a set of templates for performing common tasks, and a collaborative participant may be guided through a wizard-like interface that asks interview-style questions for completing a particular workflow.

The foregoing examples of some existing problems with data storage, archiving, and restoration are intended to be illustrative and not exclusive. Other limitations will become apparent to those of skill in the art upon a reading of the Detailed Description below.

BRIEF DESCRIPTION OF THE DRAWINGS

FIGS. 11A-11C show an example of a chain of custody report.

FIGS. 12-16 are screenshots of an example graphical user interface for searching, navigation, and recovery of data.

FIGS. 17-27 are screenshots of another example of a graphical user interface for searching data.

COPYRIGHT NOTICE

Figure 1A:
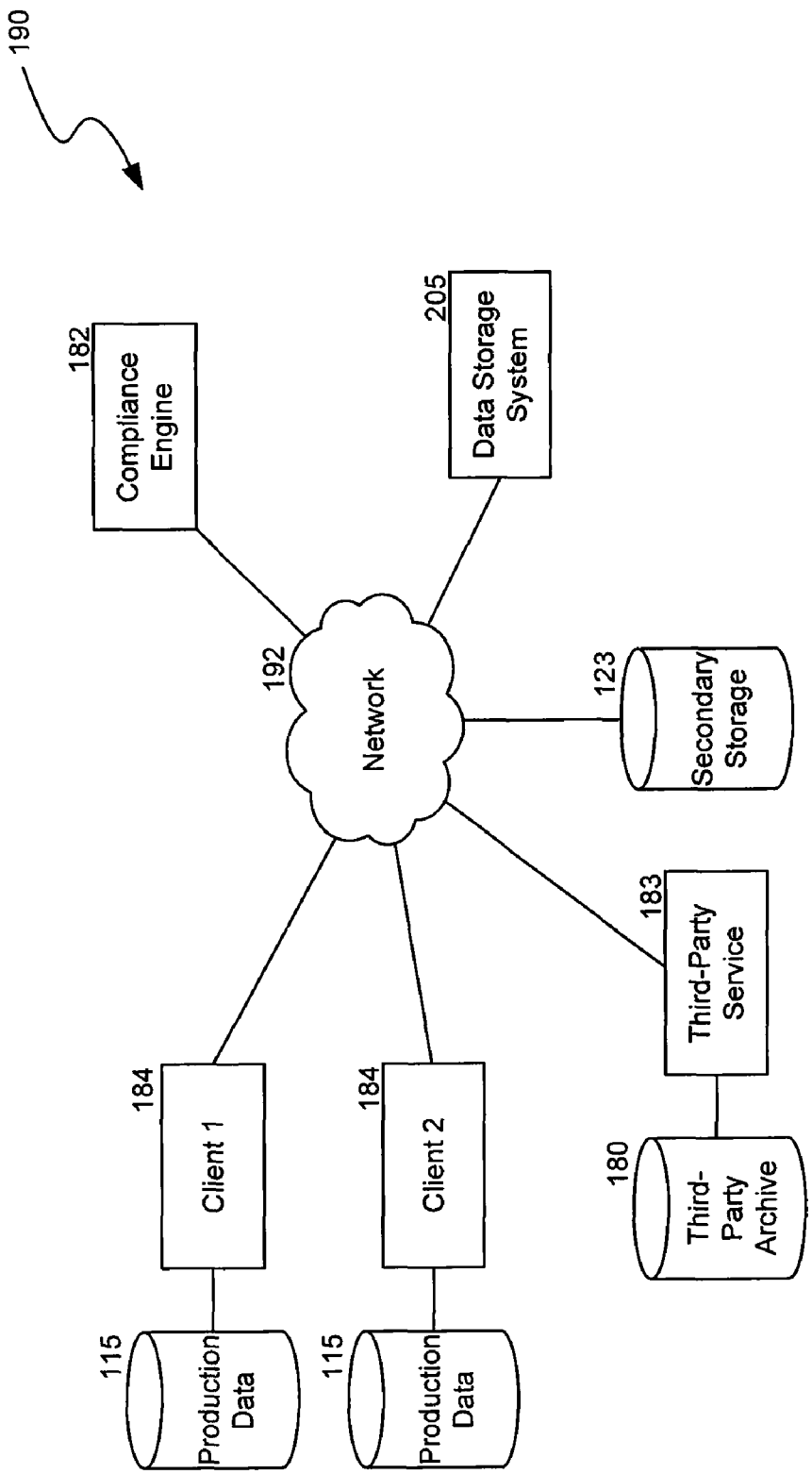
FIG. 1A is a block diagram of a suitable environment for practicing the methods described herein.

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology provided below describe systems and methods of electronic document handling that permit organizations to comply with legal or regulatory requirements, electronic discovery and legal hold requirements, and/or other business requirements. Although described in connection with certain examples, the systems described herein are applicable to and may employ any wireless or hard-wired network or data storage system that stores and conveys data and information from one point to another, including communication networks, enterprise networks, storage networks, and so on.

The systems herein enable users to archive, backup, and replicate data within a common infrastructure, creating a single unified repository for the majority of an organization's regulated data, including e-mail, files, backups, archives, SharePoint documents, and databases. The single uniform repository may span time, versions, copies, platforms, and locations (both logical storage locations and geographical locations), and storage cells.

The systems described herein provide many benefits in data retrieval, collaborative search, legal compliance, and E-discovery. For example, in a discovery request certain emails are to be located and processed via a specified workflow. Typical archive systems, storing data in boxes of tapes and other media, may need to check each and every tape in order to discover a required email. Using the secondary copy techniques described herein, the system may quickly and easily satisfy the request. For example, in creating a secondary copy (e.g., an archive copy), the system reduces redundant files and indexes the content of the files. Thus, when a user of the system provides search information for the certain emails (such as a sender's name or keywords in the body of the email), the system may easily search the content of the secondary copy using the index.

The systems described herein also provide a unified approach to data management that enables compliance, legal and IT personnel to focus their efforts on a single data repository, eliminating the need to search and preserve information in both backup and archiving applications. As described in greater detail herein, the systems permit personnel to perform collaborative searches of distributed data sources including production copies, online and offline secondary copies, and third-party archives that may be distributed throughout an organization and over distinct geographies and networks. The systems also provide personnel with tools for implementing collaborative workflows that implement various data management steps in a compliance task. These searches and workflows both cover a data set that may span time, versions, copies, platforms, and locations (both logical storage locations and geographical locations).

The systems herein permit users to define and utilize information governance policies that help automate and systematize different compliance tasks. For examples, as described herein users may define and/or utilize classification policies, workflow policies, retention policies, and/or reporting policies. Since classification, workflow, retention and reporting policies may be independently created and modified, the systems herein may responsively adapt to regulatory changes without the need for re-indexing and/or re-classifying data. The systems herein may also provide policy templates that simplify the creation, application, and modification of such policies.

Additionally, in some cases, the systems may permit indexing of production data that permits the system to search for and lock-down live production data that may be under the control of employees. Additionally, the systems may permit compliance or IT personnel to detect when a legally sensitive production file has been changed or deleted, without the need for invasive client-side software.

In some examples, the systems provide IT with the tools to initiate an effective legal hold—the ability to lock down electronically stored information—in response to anticipated litigation or other compliance requests. In some cases, the system may also provide for legal hold notifications, wherein data custodians are automatically notified that their documents or files are being preserved for compliance reasons.

In some examples, organizations may push data in any third-party data format to the systems described herein. In such examples, the systems may then index, classify, search, retain, and/or perform other data management functions upon the data. In this way, the systems may perform the value-added features described herein, even on archive copies that were generated using third-party archival software.

The systems also provide a unified dashboard user interface. From a dashboard interface, users may perform searches, participate in collaborative data management workflows, obtain data management reports or other business views of data (including audit-ready chain of custody reports), and adjust policies. From this interface, users may also obtain a "time machine" view of offline and online copies as they existed at various points in time.

Various examples of the technology will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable Environment

FIG. 1A is a block diagram of a suitable environment 190 for practicing the technologies described herein. As shown, multiple servers or clients 184 each access, create, modify and/or update production data 115. For example, a user of a desktop computer client 184 may create a word processing document and edit its content. As another example, a mail server client 184 running MICROSOFT EXCHANGE SERVER® may continually update a .pst file to reflect changes to an email mailbox. The various clients 184 are connected over a network 192 to a data storage system 205 that creates and manages secondary copies of the production data in secondary storage 123. For example, in accordance with storage policies, described herein, the data storage system 205 may create and manage tape archive copies of the production data 115 to provide for long-term retention of data. As another example, in accordance with storage policies, the data storage system may create and manage backup copies to provide for quick restoration of a client after a system failure. Additionally, the data storage system may receive, e.g., via a third-party service 183, third-party data 180, such as older archived data of an organization that was created by a third-party archiving service or software. The data storage system 205 may create secondary copies of the third-party data 180 within its secondary storage 123 and/or perform other data management operations upon the third-party data (e.g., indexing and deduplication). As described in greater detail herein, the data storage system 205, as part of its function, may perform value-added services upon the data it receives from clients and/or third-party data, such as encryption, deduplication, content indexing, and life cycle management.

A compliance engine 182 works in conjunction with the data storage system 205 to perform various functions that facilitate an organization's compliance with regulatory requirements, including E-discovery requirements. For example, as described in greater detail herein, the compliance engine may provide functionalities such as collaborative searching, automated classification of data, data mining, collaborative data management and workflows, legal holds and related notifications, data audits and reports, and dashboard views of an organization's data. As described herein, a data administrator or similar user within an organization may utilize the compliance engine 182 to perform such functionalities upon the entire unified corpus of data generated by the organization, including production data 115, third-party data 180, and copies in secondary storage 123.

Suitable System

Figure 1B:
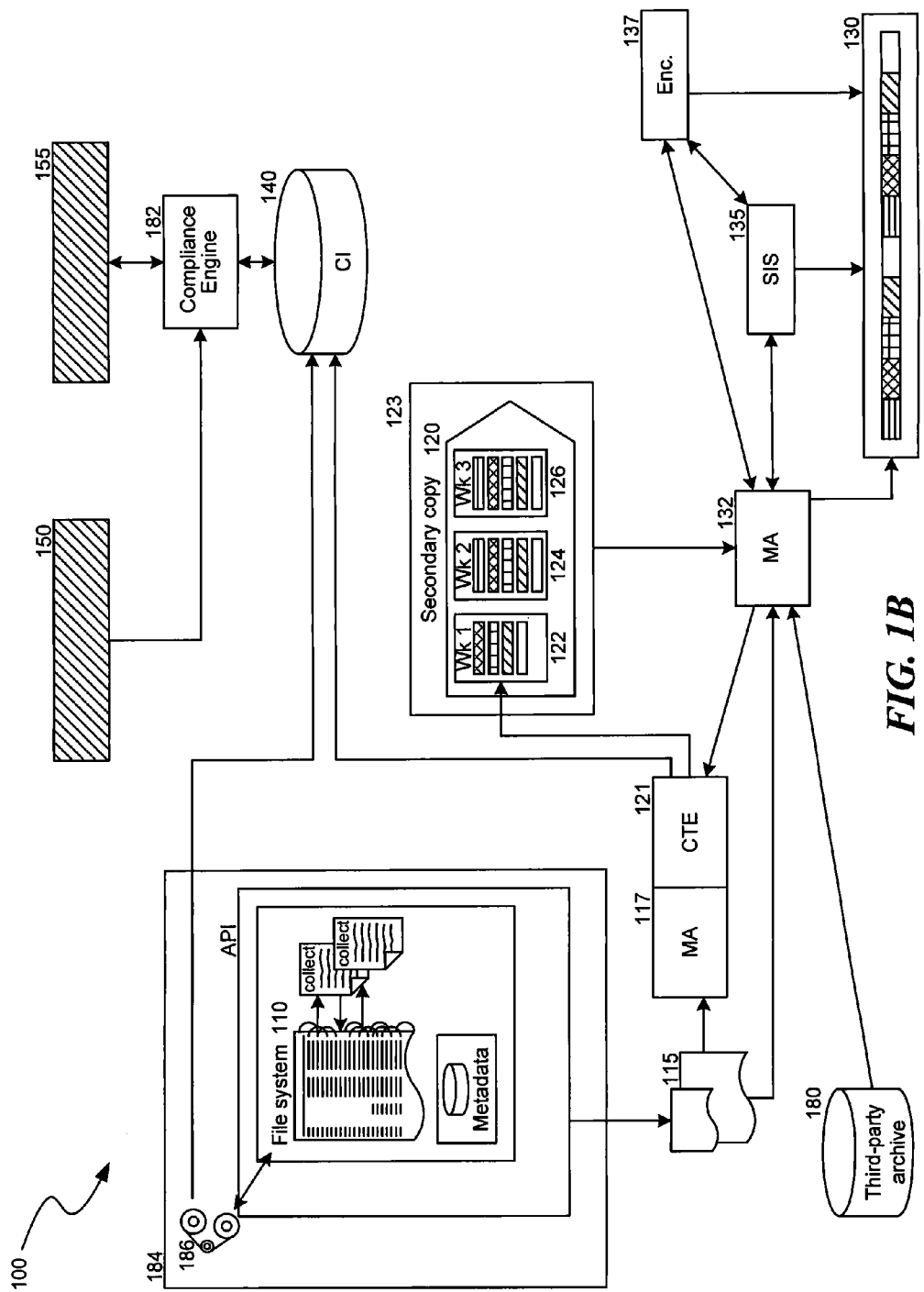
FIG. 1B is a block diagram illustrating a data management system.

Referring to FIG. 1B, a block diagram illustrating a data management system 100 is shown. Unless described otherwise herein, aspects of the system may be practiced with conventional systems. Thus, the construction and operation of the various blocks shown in the Figures may be of conventional design, and need not be described in further detail herein to make and use the system, because such blocks will be understood by those skilled in the relevant art. One skilled in the relevant art can readily make any modifications necessary to the blocks of the Figures based on the detailed description provided herein.

The system 100 may include a client 184 with a file system 110 that creates, modifies and/or updates originally created data 115 (i.e., data that is first created by file system 110). The created data may also be called herein a "production copy" of the data or more simply "production data." For example, the file system may create a word processing document that is stored in the file system and accessed by a user of the file system. Alternatively or additionally, although not shown, an Exchange server, a SQL database, or similar data-generating application running on the client 184 may originally create data 115 that is also called a production copy. As an example, an Exchange server may create an email message data object within a larger .pst file. As shown, the file system and/or a data-generating application may also create metadata that is associated with a production copy of the data. Examples of metadata include, for example, an indication of users who have created, accessed or modified the data, an application that generated the data, a location of the data, a file type, the times that the data was created, accessed and/or modified, an indication of which users are custodians of the data, application-specific metadata (e.g., header information such as an email recipient, sender, or subject line), the location of the data within a file system and/or file (e.g., within a .pst file), a time the data was deleted from a file system or file, file security permissions and/or settings, a file name, and a file size.

The system 100 may perform various data storage operations and data transfers in order to make a secondary copy 120 of the original data 115 in secondary storage 123, such as a backup or recovery copy, using a media agent 117 or similar secondary storage computing device. For example, the system 100 may copy data on a daily or weekly basis to secondary storage 123. In the example of FIG. 1, the secondary copy 120 in secondary storage contains data for a first week 122, a second week 124, and/or a third week 126. A backup or recovery secondary copy of the original data will generally be stored in online secondary storage to permit faster recovery of a client. However, in some examples, the secondary copy may be stored in less accessible "offline" secondary storage.

The system 100 may also create an index 140 of the content of the data 115 (including metadata associated with the data 115) using a client-side connector 186 and/or a content tracking engine 121. As described herein, using the index, the system may facilitate searches of the content of the data 115, such as searches of the data content, metadata associated with the data, and so on. In some examples, the content tracking engine generates index information by accessing the contents or metadata of the secondary copy 120. In some examples, a client-side connector 186 continuously, periodically, or intermittently generates index information by performing content indexing of the original data 115 and/or by retrieving metadata from the file system and/or a data generating application such as an Exchange server. In some examples, the client-side connector generates index information prior to the creation of a secondary copy 120 of the original data. In some examples, the client-side connector may send indexing information to the index 140 directly (as shown) or through intermediaries such as the media agent 117. In some examples, the client-side connector and/or content tracking engine indexes content using commercially-available indexing technologies such as MICROSOFT® F.A.S.T.®.

In addition to storing content information and other metadata, the index 140 may also store chain of custody information for data that reflects how a document or data object has been accessed and/or modified over time. For example, if a document is modified to remove a virus, the content tracking engine 121 may update the index 140 to reflect how the document was modified. As another example, if a document is converted to a different format (e.g., if a word processing document is converted to a plain-text document), the content tracking engine 121 may update the index 140 to reflect this conversion operation. In some examples, the system detects modifications to a document or data object by detecting a changed hash value. For example, during a secondary storage operation (e.g., deduplication), the system may need to calculate the hash for a document, for example, to determine if the system already has a copy of the document stored therein. If the calculated hash does not match a previously stored hash for the same document, it means that the contents of the document have changed. This modification may then be noted in the index to provide improved chain-of-custody information. Additionally, when a particular data object (e.g., a primary data object) is "aged off" the system, the index may continue to maintain the metadata associated with that primary data object. The index may then link the metadata of this primary object to a secondary copy of the primary data object.

The index 140 may also store other information regarding the provenance of a file or document, e.g., by indicating which documents were predecessor versions of the same file or document. As yet another example, the index may indicate how a file or document has moved through various storage locations and/or storage media (e.g., from disk, then to an on-site tape library, and then to an off-site tape storage location). In this way, the index 140 maintains a referential model that provides a complete audit trail linking metadata back to its original data object. The index may do so without needing to maintain the original data object in storage. Thus, by storing chain of custody information in the index 140, the system may reduce the total storage requirements of the organization while still ensuring compliance with recordkeeping requirements.

Additionally, the system 100 may create an archive copy 130 of the original data 115 using an archive copy component 132, such as a media agent used to create archive copies. The archive copy created by the archive copy component may be stored either online or offline. The archive copy component may communicate and interact with the content tracking engine 121, so that the archived data is also indexed within the index 140 and thus searchable. The archive component 132 may also utilize a data redundancy component 135, that reduces or removes some or all of the redundant data under management by the system, e.g. data within the secondary copies 122, 124, 126, when creating the archive copy 130. Such a process may be referred to herein as "single instancing" or alternatively "deduplication." The system may also encrypt the data via an encryption system 137, either during or after the data is single instanced.

In some cases the system 100 enables organizations to create an archive copy 130 of their data without using primary system resources such as resources near or located within the file system 110, (e.g., by creating the archive copy of the data from the secondary copies 122, 124, 126). In such cases, the system does not require that the secondary copy 120 is in a format that is suitable for archival purposes. Furthermore, the system 100 may index the archived data so that the index 140 includes indexing information for the archived data. The system may furthermore eliminate or reduce any unnecessary copying of data to the data archive via the redundancy component 135.

In some cases, the system 100 may create archive copies 130 of data from an original data set 115, or primary copy. For example, a file system 110 containing the original data set 115 may receive a request from a user or another process to initiate an archiving process, such as via a graphical user interface that is in communication with the file system via an application programming interface (API). The GUI may receive a request from a user, such as a system administrator, to archive a subset of the primary copy, such as a file, a group of files, and so on. For example, the system administrator may select, via a GUI, a set of data comprised of one or more files, directories, or logical volumes to archive. Upon receiving the request, the system instructs the archive copy component 132 to create an archive copy of the selected data files. The system may single instance or deduplicate data using the redundancy component 135, encrypt data using the encryption component 137, and/or index the content of the files using the content tracking engine 121 when creating an archive copy of the files.

In some cases, the system may create new archive copies from previously stored or archived copies of data sets, which may include third-party archive data 180. For example, the system may receive a data set that was archived using a third-party archival software or service and instruct the archive copy component 132 to archive the data set as described above. When creating a new archive copy, the system may single instance or deduplicate the files using the redundancy component 135, encrypt data using the encryption component 137, and/or index the data using content tracking engine 121. The new archive copy created by the system may be stored on the storage media that stored the previous archive (e.g., by overwriting the media) and/or may be stored elsewhere. In this way, the system may perform the various functionalities described herein even upon data that was not originally backed up or archived by native media agents 117, 132 within the system. As an example, the system may process archive copies created by third-party software and stored on multiple tapes. In some examples, the system does not create a new archive copy, but simply indexes the existing archive data so that it may be effectively searched, classified, and utilized in data management workflows. As another example, the system may be implemented as a "cloud"-based software service that receives and processes archive copies that were created by third-party archiving software.

The system 100 also includes a compliance engine 182 that facilitates various compliance tasks as described herein. Among other functionality, the compliance engine may facilitate searches from end users via an end user search component 150, such as a web browser or application interface. The compliance engine may also permit system administrators and/or other users to conduct collaborative searches related to regulatory compliance, E-discovery, or other business requirements of an organization via a compliance management component 155. The compliance management component may facilitate such searching via an administrative dashboard or similar graphical user interface, as described in greater detail herein. The compliance engine 182 is described in greater detail herein with respect to FIG. 2B.

Examples of a Data Storage System

The system described herein may collaborate with and utilize some or all components of a data storage system 205, such as a data storage system used to create secondary copies of data such as backup copies of data, recovery copies, archive copies, and so on.

Figure 2A:
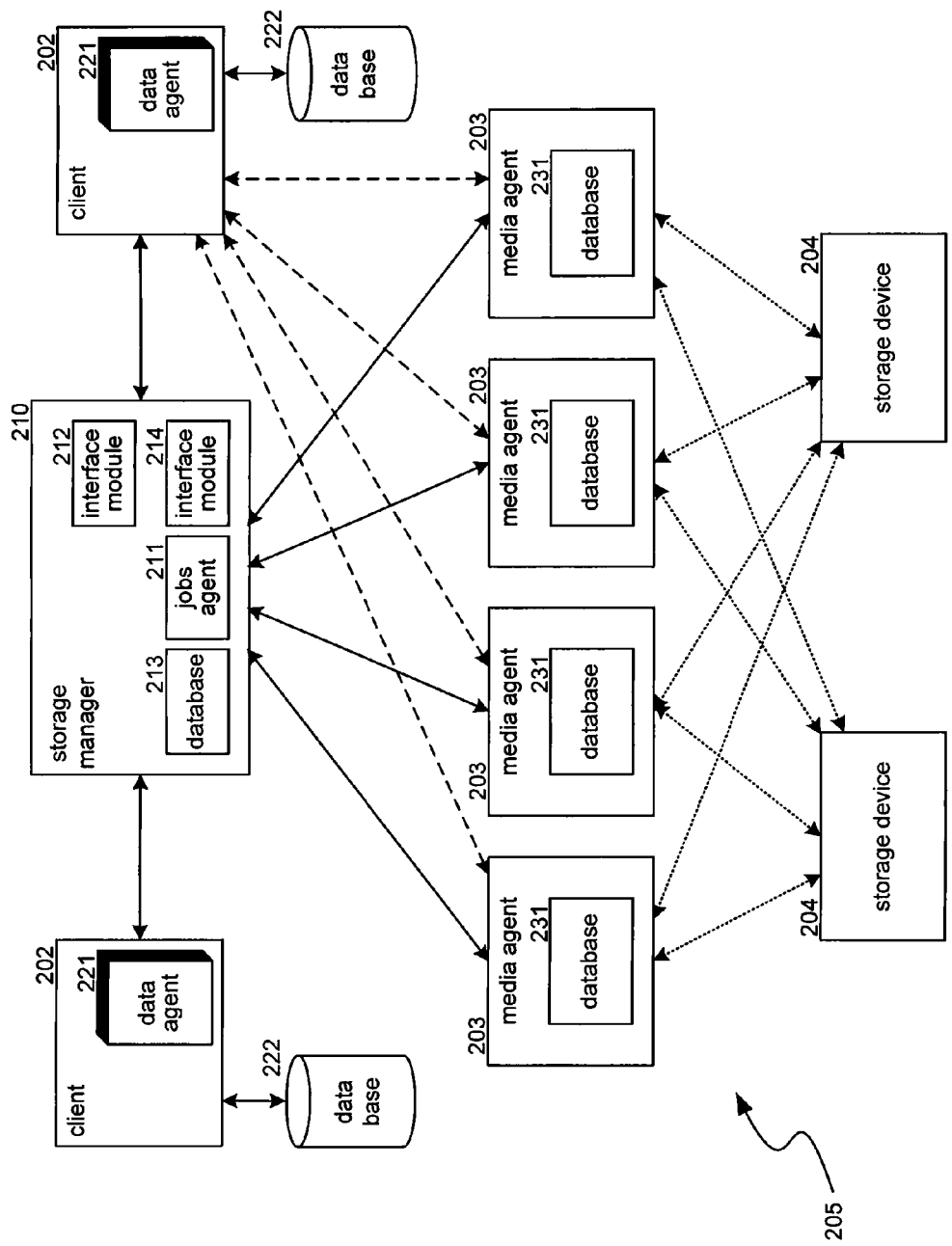
FIG. 2A is a block diagram illustrating an example of a data storage system.

Referring to FIG. 2A, a block diagram illustrating an example of a data storage system 205 is shown. Data storage systems may contain some or all of the following components, depending on the needs of the system.

For example, the data storage system 205 contains a storage manager 210, one or more clients 202, one or more media agents 203, and one or more storage devices 204. The storage manager 210 controls the media agents 203, which may be responsible for transferring data to storage devices 204. The storage manager 210 includes a jobs agent 211, a management agent 212, a database 213, and/or an interface module 214. The storage manager 210 communicates with client(s) 202. One or more clients 202 may access data to be stored by the system from database 222 via a data agent 221. The system uses media agents 203, which contain databases 231, to transfer and store data into storage devices 204 to create secondary copies of data. The storage devices 204 may be magnetic tapes, optical disks, USB and other solid state devices, cloud storage sites, other similar media, and so on.

The data storage system 205 may include software and/or hardware components and modules used in data storage operations. For example, the components may be backup resources that function to backup data during backup operations or may be archiving resources employed by the system to create archive copies. Of course, the components may perform other storage operations (or storage management operations) other that operations used in data backups and/or data archiving. For example, some resources may create, store, retrieve, and/or migrate primary or secondary data copies. The secondary data copies may include snapshot copies, backup copies, HSM copies, archive copies, and so on. The resources may also perform storage management functions that may push information to higher level components, such as global management resources.

In some examples, the system performs storage operations based on storage policies. For example, a storage policy is a data structure that includes a set of preferences or other criteria to be considered during storage operations. The storage policy may determine or define a storage location (e.g., in secondary storage 123), a relationship between components, network pathways, accessible data pipes, retention or life cycle periods or schedules, compression or encryption requirements, preferred components, preferred storage devices or media, and so on. Storage policies may be stored in storage manager 210, or may be stored in other resources, such as a global manager, a media agent, and so on.

Creating Secondary Copies of Data

Figure 3:
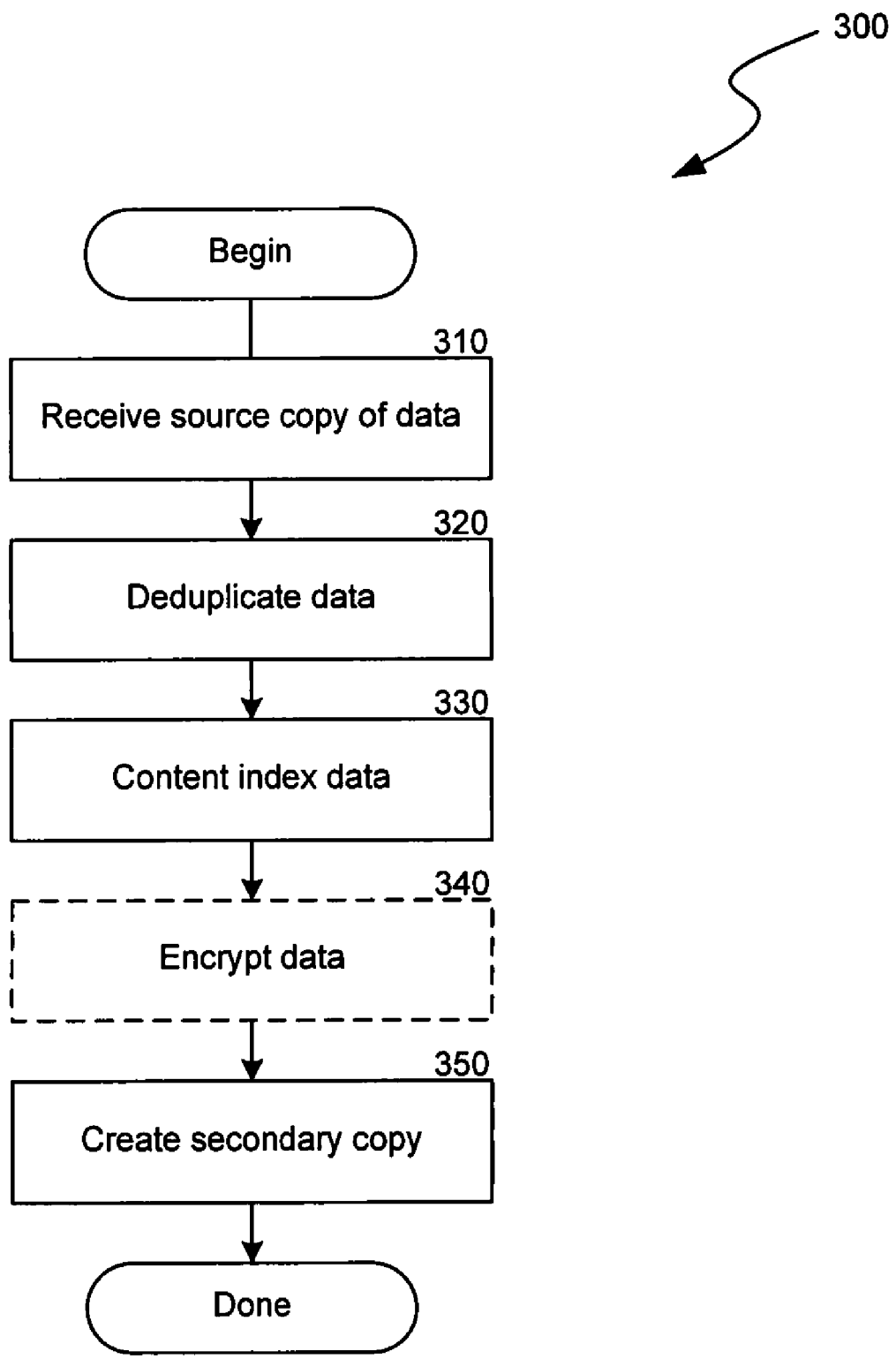
FIG. 3 is a flow diagram illustrating an exemplary routine for creating a secondary copy of data.

Referring to FIG. 3, a flow diagram illustrating an exemplary routine 300 for creating a new secondary copy of data is shown. The routine 300 may be performed, for example by components within the data storage system 205. In step 310, the system receives a source copy of an original data set from a file system. The source copy may be, for example, a primary or production copy, a recovery copy, backup copy, snapshot, an archive copy including a third-party archive copy, or another type of secondary copy. Alternatively, the system may access the source copy or otherwise communicate with data storage components in a data storage system to gain access to the data.

In step 320, the system may deduplicate the data; that is the system may only transfer a single instance of any redundant data instances or transfer less than all of the copies of a redundant data instance. For example, the system may reduce the data set to be transferred by removing duplicate instances of data files and other information. Further details about creating secondary copies with unique or deduplicated data files may be found the assignee's U.S. Pat. Pub. No. 2008-0243958, entitled SYSTEM AND METHOD FOR STORING REDUNDANT INFORMATION, the entirety of which is incorporated by reference herein.

In step 330, the system may index the data stored in the new secondary copy. For example, the system may index the content of the data and update the index 140 with the identified content to make the identified content available for searching. For example, the system may identify and index data files and objects such as word processing documents, spreadsheets, email objects, database records, powerpoint presentations, metadata, and so on. The system may check the data against previously indexed data, and only index new or additional data. The system may then parse, process, and store the data. For example, the system may add information to the index such as the location of the content, associated metadata, keywords found in the content, and so on. The system may add chain-of-custody information to an index. For example, the system may include information about how the data is being modified during process 300. The system may index the content before or after performing other processing to the data, such as encryption, single instancing, and so on. Further details about indexing content may be found in commonly assigned U.S. Patent Publication No. 2008-0091655, filed Mar. 30, 2007, entitled METHOD AND SYSTEM FOR OFFLINE INDEXING OF CONTENT AND CLASSIFYING STORED DATA.

In step 340, the system may optionally encrypt the data before or after the new secondary copy is created. For example, the system may employ many different techniques for encrypting a secondary copy such as an archive copy. Further details about encryption and encrypting secondary copies of data may be found in commonly assigned U.S. Patent Publication No. US2008-0320319A1, filed on Mar. 31, 2008, entitled SYSTEM AND METHOD FOR ENCRYPTING SECONDARY COPIES OF DATA. In step 350, the system creates the new secondary copy of the data set. The system may for example, store a new archive copy in archive file format by storing data chunks onto physical media.

In some cases, the system may reduce data gaps that can occur in typical data storage systems. These systems may archive data by sending recovery copies to a data archive on, for example, a monthly basis. However, often, data will undergo many changes and modifications within a month. Thus, the data storage system may only store the modifications present at the monthly increments, causing gaps in the archived data set.

The system may reduce such data gaps by creating an archive copy when the system creates a recovery, backup, or other secondary copy. For example, the system, using deduplication and other redundancy techniques, may periodically or constantly create an archive copy of an original data set, storing original data and any incremental changes to the data. Thus, the system is able to catch and archive the incremental changes and continually build an archive copy for data under management of an organization.

The system provides an indexed, continuous archive copy of data under management containing little or no redundancy without taxing the systems at the data source, among other benefits.

Existing Archived Data Sets

In some cases, the system may perform some or all steps in the routine 300 upon existing secondary (e.g., archived) data sets. To illustrate one example, some archived data sets are nothing more than many boxes of magnetic tapes storing data. These tapes often contain redundant data that may take up more than half of the entire archive and the data may not be indexed, thus it may not be readily searchable. Thus, in some cases, it may be beneficial to apply the indexing and deduplication methods described herein in order to reduce storage costs, provide acceptable recovery times, and make the data more accessible for compliance tasks. The system can create a secondary copy of the data that is independent of the system that created the data, applications that created the data, and so on. The system can therefore receive data from various heterogeneous sources (including third-party sources such as archive copies created by third-party archiving software or services) and create a single independent secondary copy of data, such as an archive copy, that may be used as a long term copy of the data.

In such cases, prior to performing the routine 300 of FIG. 3, the system may retrieve or otherwise access an existing archived data set. For example, the system may recall tapes of an archive, move the tapes to a data library of a data storage system, and access the tapes to read the data and create the new secondary copy. Additionally, during the routine 300 of FIG. 3, the system may permanently erase any data from the previously archived data set that is no longer needed, further reducing the size of the created secondary copy.

Compliance Engine

Figure 2B:
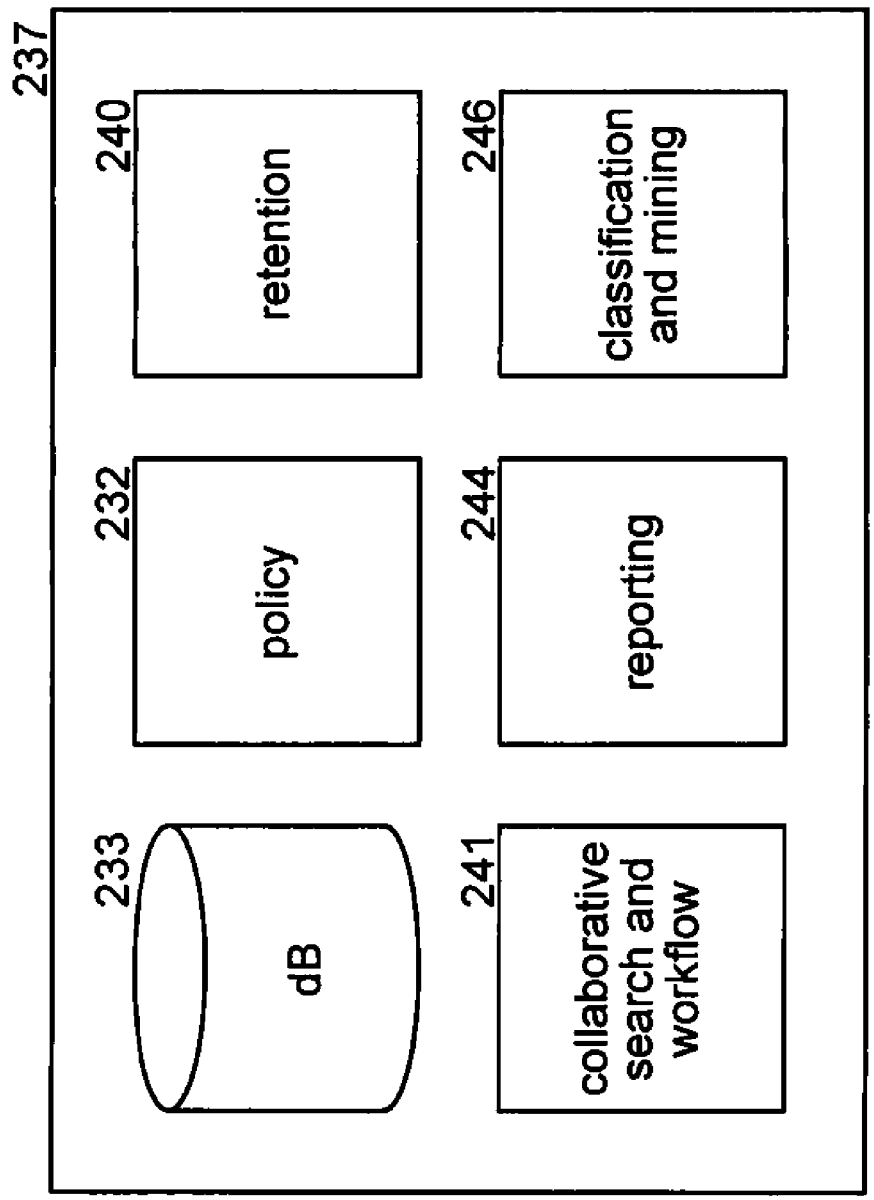
FIG. 2B is a block diagram illustrating components of a compliance engine.

FIG. 2B is a block diagram illustrating components of a compliance engine 182. As shown, the compliance engine may include a policy module 232, collaborative search and workflow module 241, a classification module 246, a retention module 240, a reporting module 244, and a database 233.

The policy module 232 permits a user to specify and modify various information governance policies that define how data should be managed in order to comply with a certain regulation or business objective. The various policies may be stored, for example, in the database 233. An information governance policy may comprise one or more of: a classification policy, workflow policy, retention policy, and/or reporting policy, each of which is described herein. An information governance policy may align with one or more compliance tasks that are imposed by regulations or business requirements. Examples of information governance policies might include a Sarbanes-Oxley policy, a HIPAA policy, an E-Discovery policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input.

A classification policy defines a taxonomy of classification tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or similar terms.

One specific type of classification tag, which may be added to an index at the time of indexing, is an entity. An entity may be, for example, any content that matches a defined data mask format. Examples of entity tags might include, e.g., social security number (e.g., any numerical content matching the formatting mask XXX-XX-XXXX), credit card numbers (e.g. content having a 13-16 digit string of numbers), SKU numbers, product numbers, etc.

A workflow policy describes a process of various data management steps that should be taken to identify and handle a set of documents, files and/or or objects known as a review set. A review set is a set of documents that are relevant to the workflow; it is typically generated by conducting a search (e.g., a search of an index), although a user may define a review set by any other method. A workflow policy may define methods for identifying the members of the review set; for example, it may define specific search criteria (e.g., specific keywords, metadata, classification tags, or other criteria). Alternatively or additionally, the policy may prescribe a particular search interface that a user may utilize to conduct a search in order to generate a review set. It is important to note that a review set is generally a "virtual review set," because the relevant set of documents typically is not consolidated into a single physical data repository or silo before a subsequent workflow is applied to the set. Instead, typically, the review set simply refers to or links to various documents that may be distributed on storage media (e.g., primary and secondary) throughout the organization. The review set may be shared among multiple users.

A workflow policy also defines the roles, responsibilities, and/or security schemes applicable to collaborative participants who process the review set in the workflow. For example, an E-Discovery workflow policy might require that the set of documents tagged as "privileged" be subjected to a collaborative three-step review process that progresses from a paralegal, then to an associate, and finally a senior attorney.

A workflow policy may also define other outcomes that should occur during the processing of a review set. For example, a workflow policy might further specify that if a document is tagged as "under legal hold," the compliance engine 182 should automatically notify the custodians of the document of their legal obligation to retain the document, e.g., by automatically sending an email to the custodians. As another example, a workflow policy might specify that at a certain stage in processing, the system should create a new secondary copy of the review set (or a subset thereof) or export the set (either as a secondary copy, or as an XML summary). For example, a Sarbanes-Oxley workflow policy might require that the system copy a review set of documents tagged as "corporate officer correspondence" into a dedicated archive file.

A retention policy describes how to retain documents in primary and/or secondary storage within the data storage system. For example, the retention policy may describe how to retain data that has been tagged in a certain manner and/or otherwise processed during a data management workflow. It may, for example, specify a retention period or life cycle, the type of media that should be used to store a document, storage operation schedules, the types of security schemas that should be applied, etc. For example, a retention policy may specify that primary copies of "patient confidential" documents are stored on high-security data servers for at least 5 years and that secondary copies of "patient confidential" documents are stored for at least 10 years using a certain form of encryption.

A reporting policy specifies the business information that is provided to users regarding the status of the organization's unified data set, or a subset thereof. As a first example, a reporting policy may prescribe reports that indicate the degree to which an organization has complied with a particular regulation, for example, by comparing the status of the organization's data to certain performance metrics or benchmarks. As another example, a reporting policy may define reports that indicate how a review set has progressed through various stages of a particular workflow. A reporting policy may also specify the frequency, recipients, and format of such reports. Various reports are described in greater detail herein.

The storage manager 210, data agents 221, media agents 203, and other components of a data storage system 205 may implement various functionalities specified by an information governance policy. For example, a storage manager may facilitate searches and implement aspects of retention policies, including for example, pushing retention policies down to media agents. As another example, data agents may implement aspects of legal holds that are specified by a workflow policy. Media agents may perform various secondary storage and retrieval operations required by a retention and/or work flow policy.

Various other aspects of information governance policies are illustrated herein with respect to various example workflows and compliance tasks. Although information governance policies may be described herein primarily in conjunction with compliance tasks, one having skill in the art will appreciate that information governance policies described herein may be utilized to achieve other business objectives that are unrelated to regulatory or legal compliance.

In some examples, the collaborative search system allows a user to develop or modify an information governance policy using templates associated with common search and other compliance tasks. Each template may provide for example, a default taxonomy of classification tags and classification rules; search or other review set criteria; workflow steps, participants, and security rules; data storage retention periods and conditions; default reports and/or compliance benchmarks. A user may modify a template to adapt it to their specific compliance task, e.g., via a graphical user interface or during the performance of a workflow.

Many different templates can be created to guide collaborative participants through the steps of data classification, search, review, reporting, and related tasks. For example, a collaborative participant may select a Sarbanes-Oxley template that provides a classification policy that includes tags related to materials that are required to be reviewed under the Sarbanes-Oxley Act (e.g., "officer correspondence") and a workflow policy that defines a default search query based on these defined tags. The collaborative participant might then adjust the classification tags to accommodate information that is specific to the organization (e.g., might associate the "officer correspondence" tag with the keyword criteria "Carly Fiorini.").

Figure 9:
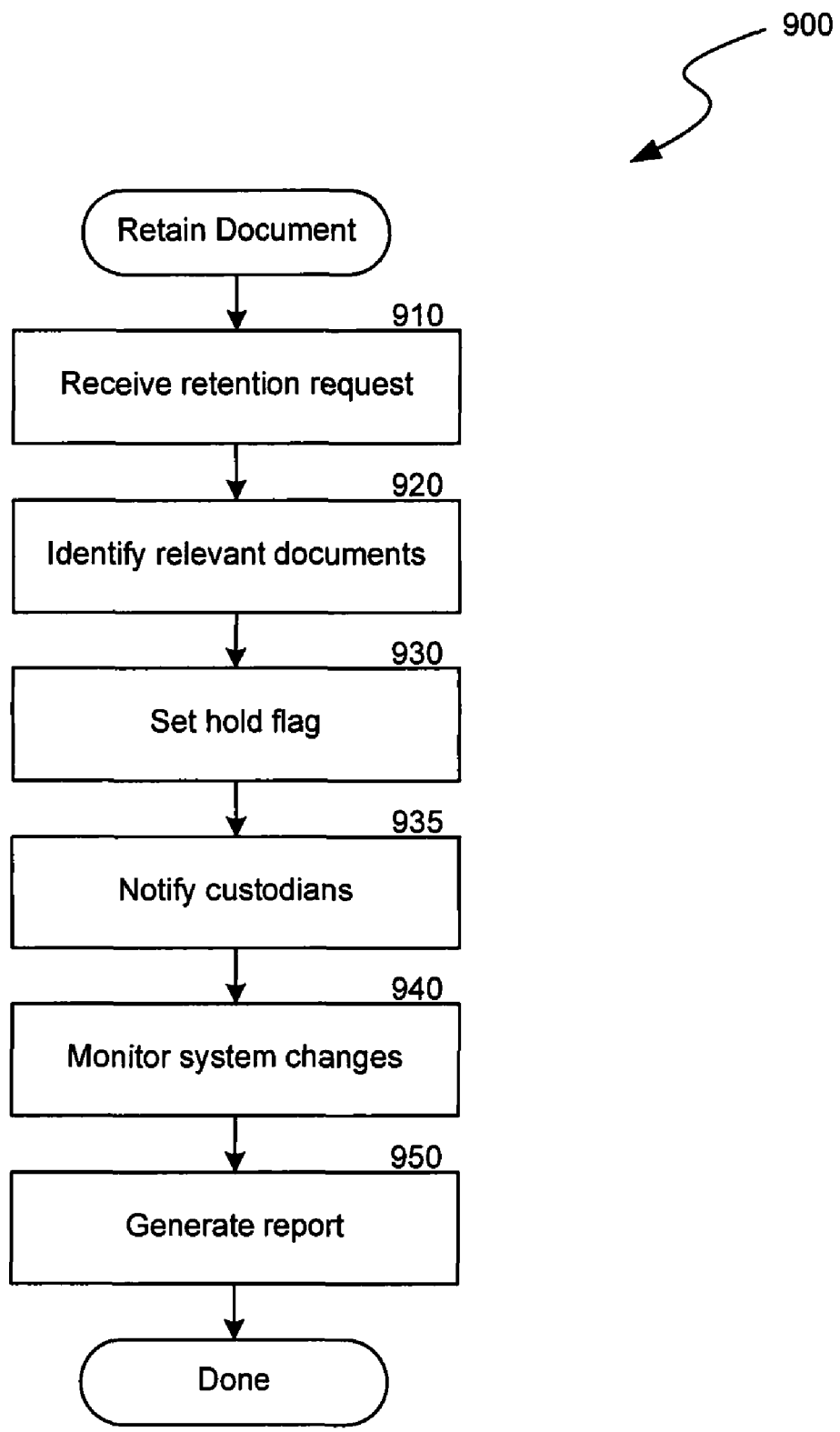
FIG. 9 is a flow diagram illustrating typical processing in response to a document retention request.
Figure 10:
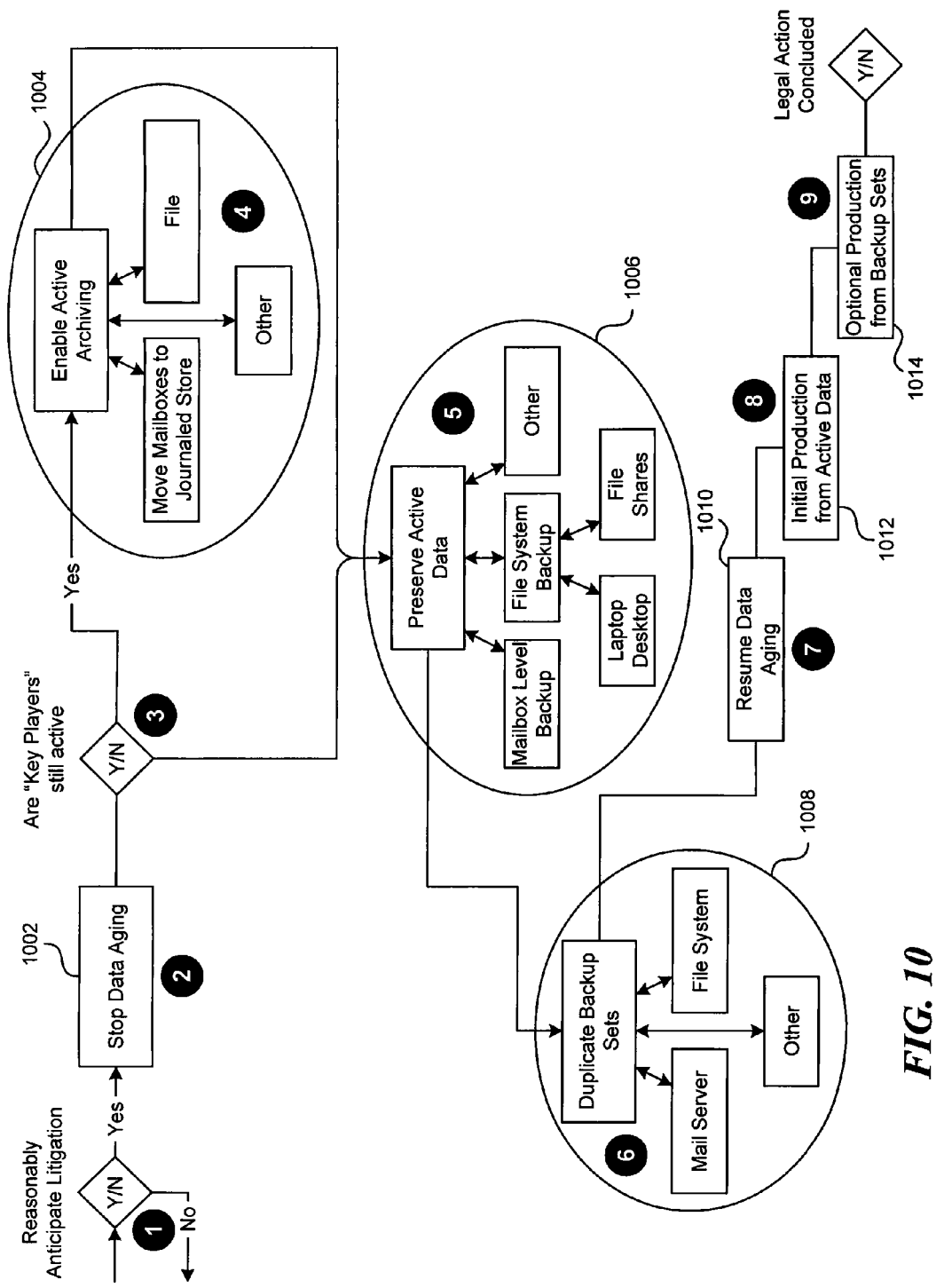
FIG. 10 is a block diagram illustrating a legal compliance or electronic discovery process.

As another example, an E-discovery template may provide both a classification policy with tags that would be generally applicable to E-discovery tasks (e.g., "privileged," "work product," "responsive") as well as a well-defined multi-step review and/or legal hold workflow, such as the workflows described in greater detail herein with respect to FIGS. 9 and 10. As yet another example, a HIPAA template might prescribe reports that flag improper email disclosures of patient-sensitive documents and/or improper storage of patient records.

Another type of template might, for example, allow an engineer to mine data about previous products to assist in the development of a current product.

A user might also utilize an existing information governance policy as a template for a new policy. For example, a participant may have developed and successfully utilized a first E-discovery information governance policy for a product liability case relating to a product Widget X. When a product liability suit is brought relating to a different product Widget Y, the user might make minimal adjustments to the various features of the first policies (e.g., classification, workflow, retention, and/or reporting policies) to create a new information governance policy for the new case. For example, the participant might simply adjust the keywords used in data classification, but utilize the same review workflow for the resultant data review set. The system may also update or change the set of templates based on dynamically changing information, including patterns of user behavior.

Returning to FIG. 2B, the collaborative search and workflow module 241 may interact with the index 140 to facilitate searches of the content of the data 115, such as searches of the data content, metadata associated with the data, classification tags, and so on. For example, the compliance engine 182 may facilitate searches from end users via an end user search component 150, such as a web browser or application interface. As another example, the collaborative search and workflow module may permit system administrators and/or other users to conduct collaborative searches related to compliance tasks via a compliance management component 155. Such collaborative searches may be used to produce review sets for subsequent workflow processing. The compliance management component may facilitate such searching via an administrative dashboard or similar graphical user interface. Furthermore, the searching may span the entire corpus of an organization's data, including production data 115, third-party archive data 180 and secondary copies 120.

The collaborative search and workflow module 241 may also facilitate collaborative data management workflows whereby multiple persons may manually and/or automatically review, tag, annotate, and otherwise process a set of documents. As described herein, a data management workflow may be implemented in part by a graphical user interface or dashboard that permits a user to readily perform such functions. Examples of collaborative searching and collaborative data management workflows are described in greater detail herein with respect to FIGS. 4-8.

The classification module 246 is configured to perform automated classification, or tagging, of data on an ongoing basis based on applicable classification policies. The classification module may, for example, periodically or intermittently review information in the index 140 to identify documents or data objects that satisfy a particular classification rule. The module may then associate the identified documents or data objects with the corresponding tags in a searchable index, for example, index 140. More detail about automated classification and tagging can be found in the commonly assigned U.S. patent application Ser. No. 11/564,197, filed Nov. 28, 2006, entitled "SYSTEMS AND METHODS FOR CLASSIFYING AND TRANSFERRING INFORMATION IN A STORAGE NETWORK", now U.S. Pat. No. 7,734,593, which is hereby incorporated herein in its entirety.

In accordance with applicable workflow policies, the classification module 246 may also continuously, periodically, or intermittently mine the classification tags and other information within the index 140 (e.g., by searching the tag/metadata index for tags with timestamps after a certain date/time) in order to push newly classified data into designated review sets and data management workflows and/or to produce other outcomes. For example, in accordance with an E-discovery workflow policy applicable to an employment suit brought by "J. Doe," the classification module might search the index 140 on a daily basis for documents that are tagged with both the data classification tags: "J. Doe Litigation" and "privileged" and then push any new matching documents directly to legal staff for review within a workflow. As another example, in accordance with a workflow policy, the compliance engine might also notify the custodians of newly matching documents that those documents are the subject of a legal hold, such as by automatically sending an email to the custodians and providing information identifying those documents. Additionally or alternatively, in accordance with a workflow policy, the classification module may automatically direct other system components to add newly matching documents to a dedicated legal hold archive copy. Information governance policies may specify the frequency with which the classification module performs its classification and/or mining tasks.

The retention module 240 implements retention policies, in part by interacting with the data storage system 205. For example, the retention module may interact with the storage manager 210 to create or modify storage policies that are implemented by the data storage system. For example, the retention module may receive an indication that all documents that are tagged as "HIPAA patient files" must now be retained for 7 years, instead of a 5-year retention period that was specified by earlier legislation. In such an example, the retention module 240 might then adjust storage policies within the storage manager 210 to reflect this new retention period.

In accordance with reporting policies, the reporting module 244 generates reports and similar information that provide IT managers or users with a business view of the organization's data. For example, as described in greater detail herein, the compliance engine may provide a compliance officer with a report that indicates the progress that the organization's legal team has made towards completing a particular compliance task. To perform its tasks, the reporting module may access information in the index 140 and/or access various review sets.

Collaborative Search

Figure 4:
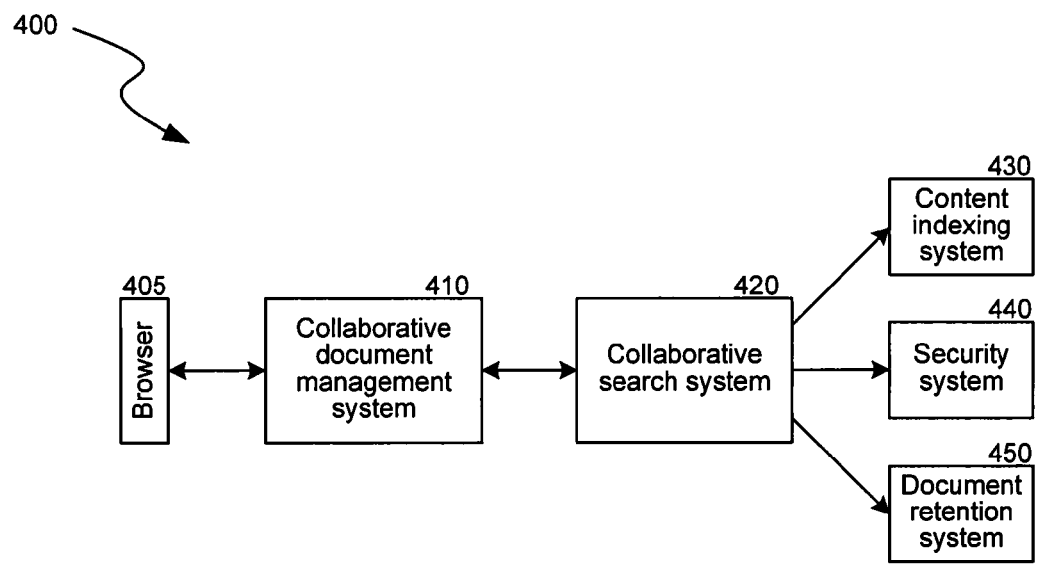
FIG. 4 is a block diagram illustrating an example architecture for integrating a collaborative search system with a collaborative document management system.

Referring to FIG. 4, a block diagram 400 illustrating an architecture 400 for integrating a collaborative search system with a collaborative document management system is shown. The architecture 400 may be used to implement various functionalities of the compliance engine 237 shown in FIG. 2B, including the collaborative search and workflow module 241. A browser 405 is used by collaborative participants to access the integrated system. A collaborative participant submits queries, receives results, and performs other collaborative tasks through the browser 405. The browser 405 is connected to a collaborative document management system 410, such as Microsoft Sharepoint Server. The collaborative document management system 410 provides a web-based portal for collaboration between collaborative participants. A collaborative document management system 410 is connected to a collaborative search system 420. The collaborative search system 420 integrates with the collaborative document management system 420 and adds additional web components, content parsers, and provides access to enterprise content. The collaborative search system 420 is connected to a content indexing system 430, a security system 440, and a document retention system 450, each described separately herein.

The content indexing system 430 provides fast access to content from various computer systems within an organization, including production data, online copies (e.g., online backup copies), offline copies (e.g., offline archive copies), and secondary copies created by third-party software or services, such as third-party archive copies. The content indexing system 430 may be implemented in whole or in part by the system shown in FIG. 1B, including the content tracking engine 121 and index 140, and as such, may provide access to disparate and distributed data sources as described previously.

The security system 440 provides users and groups that are meaningful to a particular enterprise to facilitate searching. The security system 440 also enforces access rights to collaborative content. The document retention system 450 places a legal hold on documents related to a document retention request. Further details regarding the legal hold of documents will be discussed herein.

The collaborative search system may integrate components for searching data from multiple operating systems and multiple data formats. For example, file system data on a Microsoft Windows computer system may be stored differently from file system data on a Linux computer system, but the collaborative search system may make both types of file system data available for searching. Data may be gathered from each of these types of disparate data sources and forwarded to a uniform database where the data can be collected, tagged with various classifications, and indexed for searching. The system may then display the data on differently formatted browsers.

In some examples, the collaborative search system receives criteria for a search through a collaborative process. For example, one collaborative participant may create a new query for responding to a discovery request regarding a product made by the company that employs the collaborative participant. The first collaborative participant may add search criteria including the product name and then may submit the search criteria to the collaborative document management system as a collaborative document. Another collaborative participant may open the collaborative document and add additional search criteria, such as narrowing the list of departments from which documents should be searched. For example, the second participant may include the engineering, marketing, and sales teams that worked on the product. The collaborative search system may also add additional criteria inferred from the criteria added by the collaborative participants. For example, based on the company's indexed data the collaborative search system may determine that two employees, one in a department already within the search criteria and another outside of the current search criteria, frequently send email about projects. Based on this information the collaborative search system may add the user that is outside of the current search criteria to the search criteria, or may prompt one of the collaborative participants to consider adding the user to the search criteria.

Additionally, the system may add additional search criteria inferred from dynamically changing search criteria and/or from existing classification policies or classification templates. For example, different users may commonly search for emails, such as emails that occurred at a certain time and date. The system may look at the current searching of the users and add criteria that relates to the current actions or use of the system. Additionally, the system may use heuristics type information when determining search criteria. For example, the system may identify two users are searching emails from a similar time period, and add search criteria that was added when emails from the time period were earlier searched.

Figure 5:
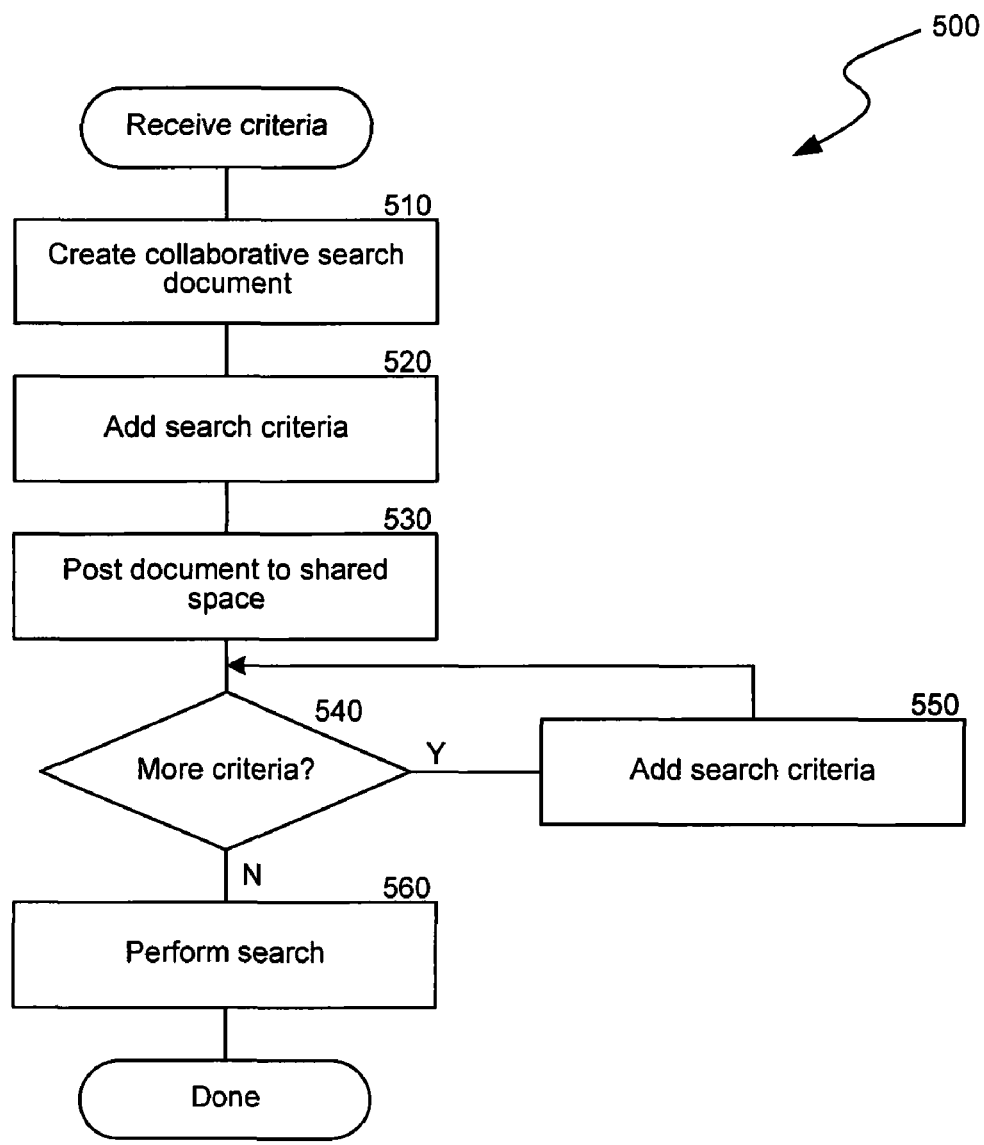
FIG. 5 is a flow diagram that illustrates receiving search criteria through a collaborative process.

FIG. 5 is a flow diagram that illustrates receiving search criteria through a collaborative process in one embodiment. In step 510 the collaborative search system creates a collaborative document. For example, a user may request that the system start a new collaborative search. In step 520, the system adds search criteria. For example, the user may specify search criteria for the new collaborative search and/or the criteria may be provided by accessing an existing classification policy or classification template. In step 530, the collaborative search system posts the document to a shared space, such as a portal website. For example, the user may request that the system make the document available to other users, or the user may email the document to another user. Alternatively, the system may make the document available in accordance with a workflow policy. The group of users who have access to the document may be restricted using security attributes as described herein. In decision step 540, if there are more search criteria, then the system continues at step 550, else the system continues at step 560. In step 550, the system receives additional search criteria from another user or other source, such as a classification policy or template. For example, a second user may add additional bodies of documents to search or additional keywords to identify within documents. In step 560, the system performs a search based on the collaborative document containing search criteria from multiple users and/or other sources. After step 560, these steps conclude.

Although not shown, the search criteria developed in process 500 may subsequently be utilized to create a new classification policy and/or to modify an existing classification policy. For example, the search criteria developed in the process 500 may be utilized as a classification rule for a classification tag named "responsive to ABC discovery request."

Data Management Workflows

In some examples, the collaborative search system defines or implements workflows that define the set of steps that are part of completing a compliance task. For example, a discovery task may have the steps of determining search criteria, finding matching documents, obtaining a primary review of the documents (e.g., by an associate), obtaining a secondary review of the documents (e.g., by a partner), obtaining a tertiary review of a key subset of the documents (e.g., by in-house counsel), and creating a new secondary copy of certain documents that the reviewers have collectively concluded are responsive and non-privileged. One collaborative participant may begin the workflow by submitting criteria for a search responsive to the discovery request. As noted above, each step of the search task may also be a collaborative process, such that, for example, multiple collaborative participants may contribute to determining the search criteria or performing a review of the found documents. Another collaborative participant may view and join the workflow at its current stage of completion. For example, a collaborative participant that is tasked with performing a primary review of the documents may open a collaborative document that contains the set of search results found during the search step, as described in more detail below.

In some examples, the collaborative search system creates a collaborative document based on a set of search results, i.e., a review set. The collaborative document provides a mechanism for multiple collaborative participants to contribute to steps within a workflow subsequent to the search process. In the example of a discovery request, the steps of performing various levels of review of found documents can consume the majority of the time spent responding to the discovery request. Many collaborative participants may be employed to perform the review, and each may be asked to add supplemental information to the search results that capture the results of each participant's review. For example, a collaborative participant may have the task of reviewing each search result and tagging the document if it contains privileged content. The collaborative document may allow each reviewer to directly add comments to documents with the search results. Collaborative documents based on search results may contain a variety of information, such as comments related to the work flow just described, notes made by a collaborative participant to himself (such as where the review of a document was stopped before taking a break), or comments from the content's author that clarifies what the content means.

Figure 6:
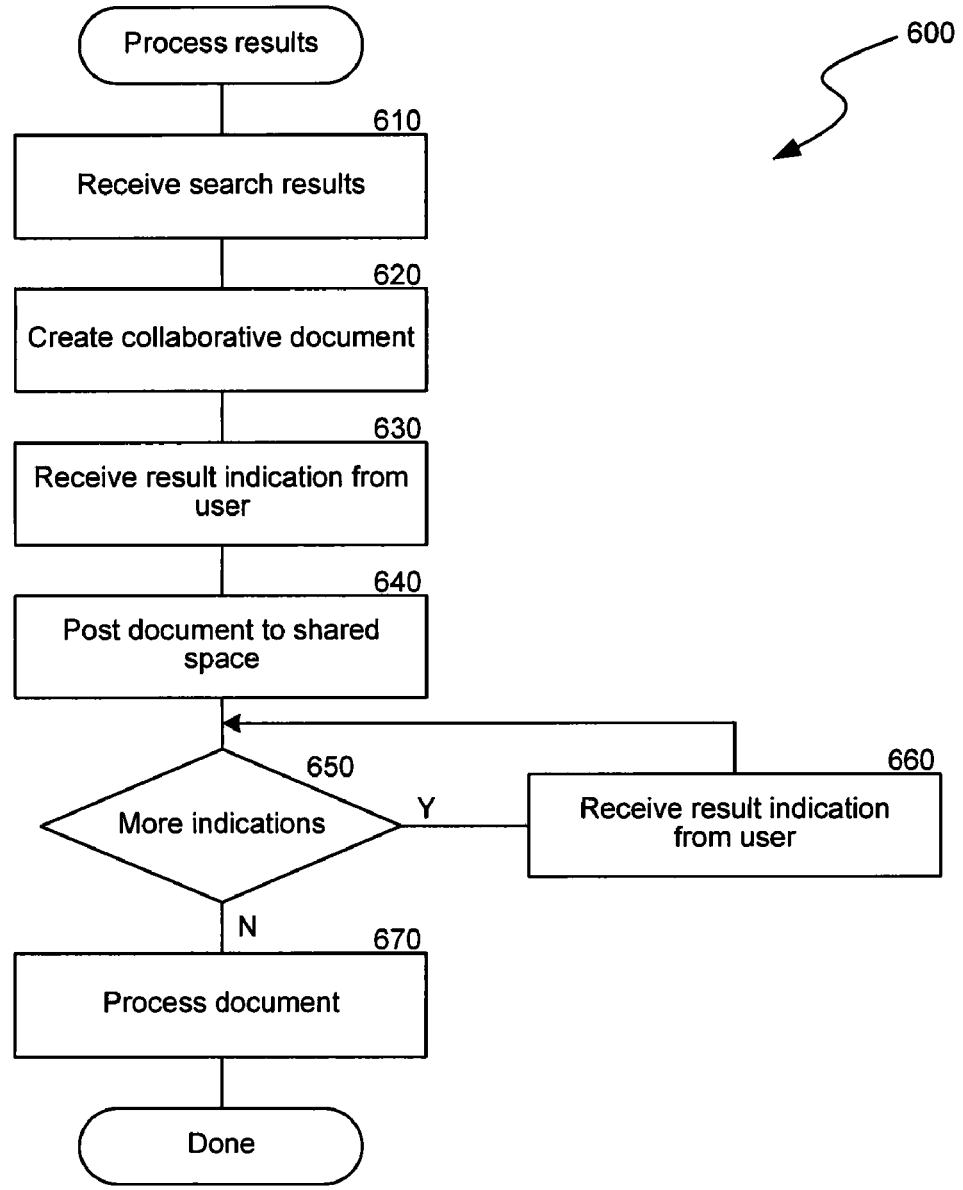
FIG. 6 is a flow diagram that illustrates working with search results through a collaborative process.

FIG. 6 is a flow diagram that illustrates working with search results through a collaborative workflow process in one example. In step 610 the collaborative search system receives search results following a search (e.g., a review set). For example, the search may be a collaborative search as described herein. In some examples, the collaborative search system may also receive additional supplemental search results, e.g., from the classification component 246, if documents match the search criteria after an initial search is performed.

In step 620, the system creates a collaborative document for storing and working with the search results. For example, the system may create a document containing a table with a row for each search result. The document might also indicate any classification tags that were manually or automatically attributed to a search result, e.g., by the classification module 246. In step 630, the system receives a result indication from a user. The result indication may be a classification tag (e.g., as defined by a classification policy), ad-hoc tag, review status flag, other type of flag, and/or comments provided by a user in order to convey information relevant to the search. For example, the user may tag certain search results as relevant to a compliance request or remove certain search results that are not relevant to a purpose of the search. The result indication may also indicate that the user wishes to remove a flag or classification tag that was automatically or manually associated with a search result.

In step 640, the collaborative search system posts the collaborative document to a shared space, such as a portal website. For example, the user may request that the system make the document available to other users, or the user may email the document to another user. Alternatively or additionally, the collaborative search system may interpret a workflow policy in order to determine the desired method for posting or otherwise sharing the document or its contents. The group of users who have access to the document or its contents may be restricted using security attributes as described herein and/or may be defined by a workflow policy. In decision step 650, if there are more search result indications, then the system continues at step 660, else the system continues at step 670.

In step 660, the system receives additional search result indications from another user. For example, a second user may add tags to search results that were not tagged by the first user or may add additional information to the search results, such as by adding another column to a table of results. As another example, a second user may remove or alter result indications, such as tags, that were provided by another user.

In step 670, the system performs additional processing on the modified search results. For example, the system may print a version of the document or distribute copies or related reports to department heads or other interested users for whom the search was performed. After step 670, these steps conclude.

Although not shown, some or all of the result indications received during the process 600 may be added to an index, such as the index 140 and/or another index that is specific to the review set. For example, if a user adds or removes classification tags during the process 600, the collaborative system search system may update an index, such as index 140, to reflect those result indications.

The user interface of the collaborative search system may include custom-developed web components to assist with the integration with the collaborative document management system. For example, Microsoft Sharepoint Server provides an object model and API for accessing collaborative features such as workflows and a search front-end that can be invoked from custom web pages using the Active Server Page Framework (ASPX). Using ASPX or other methods, custom components can be built containing scripts that dynamically build web pages for display to a collaborative participant. These web pages are dynamically produced for each collaborative participant and may list workflows to which the collaborative participant has access, collaborative documents created by the collaborative participant, templates available to the collaborative participant, and so on.

When a particular user accesses search results in the workflow, the contents and format of his graphical user interface view may be defined in part by a workflow policy that describes roles and responsibilities of the participants as well as security features. For example, a workflow policy may define how search results are advanced or promoted from one participant's view to another participant's view. The workflow policy may define these promotion processes using, for example, classification tags, review status, other document metadata and/or other result indications. To illustrate, when a partner accesses the user interface, she may only see the subset of search results in the working set that have already been reviewed by an associate and tagged as "potentially relevant." The partner may not see those search results that have not yet been reviewed by an associate or those documents that an associate has tagged as "irrelevant." As another example, during an E-discovery search, search results that were automatically tagged as "top-secret" may be immediately promoted to in-house counsel, thus bypassing any review by an outside attorney.

A user's view may also be defined in part by information from an existing security system or policy, such as Active Directory information, Access Control Lists (ACLs) and Access Control Entities. For example, the system may permit a user to see that a particular email to the CEO exists and matches the search query (i.e., the date and recipient of the email may appear in the search results that a user sees). However, the user may not be allowed to access the content of the email, since the ACL associated with the CEO's email does not allow the user to view the email. More information about using existing security systems and policies to control access to stored content may be found in the commonly-assigned U.S. patent application Ser. No. 12/058,511, filed Mar. 28, 2008, entitled "SYSTEM AND METHOD FOR STORAGE OPERATION ACCESS SECURITY," now U.S. Patent Publication No 2008-0243855, which is hereby incorporated herein in its entirety.

In some embodiments, the collaborative search system provides one or more web parts for extending the functionality of the collaborative document management system. Web parts are web widgets that can be embedded into web pages to provide certain functionality. For example, Microsoft SharePoint includes web parts such as workspaces and dashboards, navigation tools, lists, alerts (including e-mail alerts), shared calendars, contact lists, and discussion boards. A SharePoint web page is built by combining the web parts into a web page to be accessed using a browser. The content and format of the web pages may be defined in part by various information governance policies applied within the system.

One web part allows archiving items available from a shared space. The items may be documents, emails, application data, and so on. The web part leaves a stub describing the items that are archived on the shared space, and stores the items in secondary storage, such as a tape library. The archived items may still be returned as search results using metadata stored in the stub or an index to identify relevant content within the archived items. The items may be archived based on age, size, version (e.g., only keep last two versions), and so forth. When a user requests to access an archived item, the collaborative search system uses the stub to retrieve the item from the archived location. Due to granular archiving at the item level, archived items may be stored and retrieved into an environment that is different from their original environment. For example, email may be archived that was originally stored in a Microsoft Exchange 2000 email database, and restored to an NTFS file system or newer version of Microsoft Exchange. Files that were originally stored using Windows XP may be restored to a computer running Windows Vista, Unix, or another operating system. Items originally shared through Microsoft SharePoint 2003 may be retrieved using Microsoft SharePoint 2007, and so forth.

In some examples, the collaborative search system provides a user interface that does not require specialized software to be installed on the searching client system. For example, the collaborative search system may receive search criteria and display search results through a web portal that is accessible using a standard Internet web browser or graphical user interface. The collaborative search system may also provide a set of parsers for viewing content from many different sources, such as received in a list of search results, as web content. For example, the collaborative search system may provide a parser for converting a word processing document into a Hypertext Markup Language (HTML) web page. Other parsers may convert spreadsheet content, database tables, instant messaging conversation logs, email, or other structured or unstructured content into a web page format accessible via a collaborative participant's browser. In this way, heterogeneous data from many different applications is available through a unified search user interface.

Figure 7:
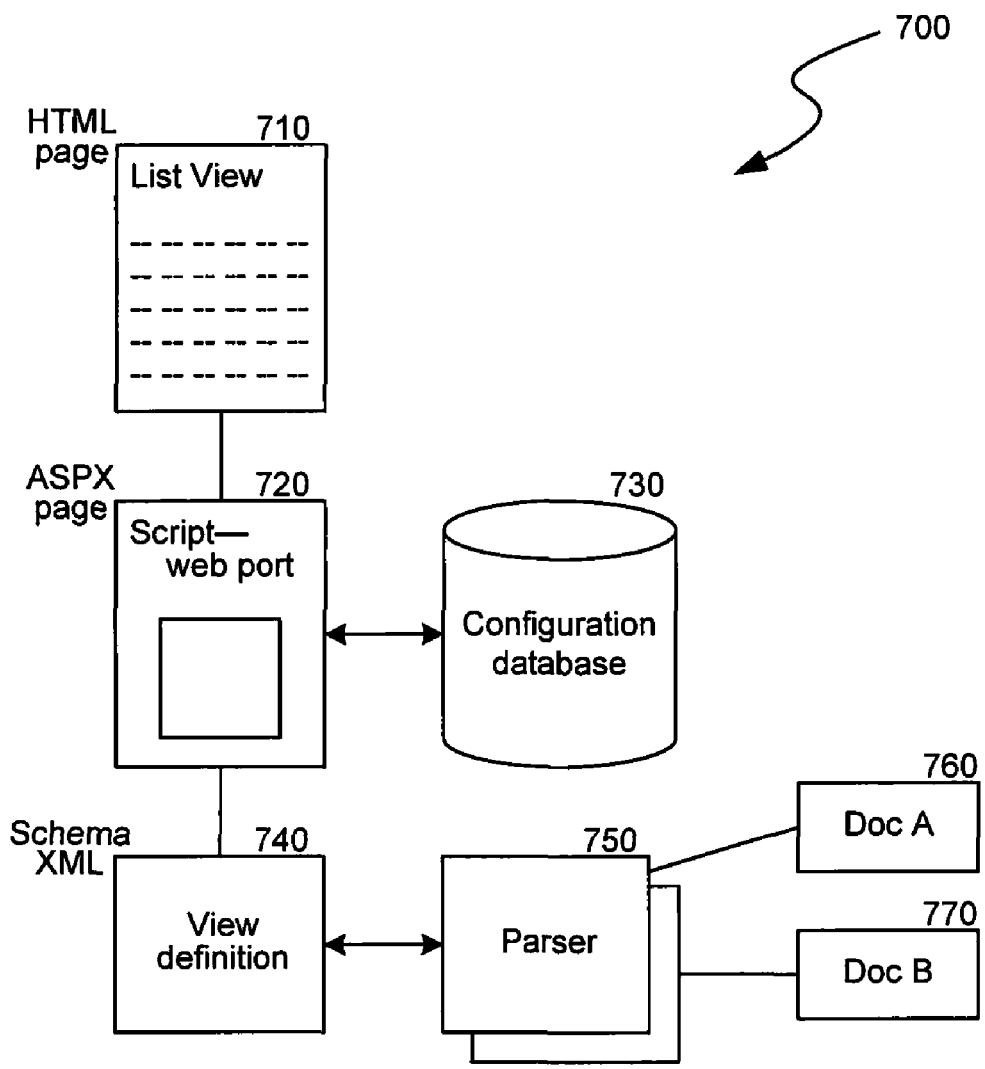
FIG. 7 is a schematic diagram illustrating an integration of parsers with a typical collaborative document management system.

FIG. 7 illustrates the integration of parsers with a typical collaborative document management system. The collaborative document management system 410 contains a configuration database 730, a schema file 740, one or more dynamic web pages 720, and one or more generated web pages 710. When a collaborative participant accesses the collaborative document management system 410, the collaborative document management system 410 consults the configuration database (which may comprise workflow policies, as described herein) to determine what to display to the collaborative participant based on factors such as the identity of the user, the particular web address the collaborative participant requested, the access rights of the collaborative participant, the state of previous requests by the collaborative participant to the collaborative document management system, classification tags, user flags, or metadata, and so on. Based on the information to display, the collaborative document management system consults the schema file 740 to determine the layout of the information for display to the collaborative participant. The schema file 740 may include instructions based on pre-determined layouts, dynamically determined layouts, templates to be included in the layout, and so on. At this point, one or more parsers 750 may be consulted to migrate data from one or more document types (e.g., 760 and 770) to an XML or other common format. The schema data is passed to an ASPX or other dynamic page 720 which may use scripts and an object model provided by the collaborative document management system to identify, parse data types, and dynamically build a page with the content for display to the collaborative participant. For example, the system may present one or more templates described above. After the scripts are run, the dynamic page 720 generates an HTML or other generic formatted page 710 that is sent to the collaborative participant's browser/GUI for display to the collaborative participant.

In some examples, the collaborative search system integrates components for making additional types of data available for searching. For example, a component may be used to provide access to an email server, such as Microsoft Exchange or Lotus Domino. Another component may provide access to database content. Third party products may be integrated with the system to provide access to some types of content. For example, FaceTime Communications, Inc. of Foster City, Calif., provides a third party product that collects instant messaging data and forwards the data to a Microsoft Exchange mailbox. Once the instant messaging is in the Exchange mailbox, the component for providing access to Microsoft Exchange data can be used to include the instant messaging content in searches.

In some examples, the collaborative search system integrates information from a security system. For example, the collaborative search system may use Microsoft Windows Active Directory to determine users whose content should be searched as part of a discovery request. Active Directory contains all of the users in an organization and organizes the users into groups. For example, a finance group may contain all of the users in the Finance Department of a company. A discovery or other compliance request may include a request for information most likely held by a particular group, such as sales data managed by a sales department. The security system may also provide restrictions on access to content retrieved in response to a search. For example, a temporary worker hired to find documents for a sales pitch might not have access to documents associated with executives or documents that contain confidential company information. The collaborative search system can manage a workflow that contains steps performed by collaborative participants with varying levels of access to content. For example, pursuant to a workflow policy, a company officer may be the only collaborative participant allowed to search a particular set of documents as part of a search request, while other collaborative participants search less restricted documents.

Document Retention (LegalHold)

The system can permit "one-click" legal holds to preserve authenticity and integrity of data globally or selectively across an enterprise in order to comply with a regulatory requirement, including for example, E-discovery requirements. Once relevant documents are tagged or identified from a query or review set, a user may instruct the system to create an archive copy of the relevant documents as noted above or an archive copy may be automatically created in accordance with a workflow policy. Such a streamlined legal action workflow permits a lawyer, compliance officer, administrator, or other user to quickly and efficiently assess whether a legal hold should be implemented, and if so, allows that user to implement such a hold so that documents are preserved to conform to discovery requests or other legal requirements. In some examples, the system effectively sets an "undelete" flag to put a legal hold on electronic data. This undelete flag may prohibit it or inhibit it from being deleted or encrypted and/or may trigger additional operations as described herein. In general, legal holds can be administered globally and/or selectively across the data storage enterprise based on search criteria, custodian, keywords, and/or classification tags.

The system may support legal hold on a wide range of compliance media including NetApp SnapLock, HDS DRI and HCAP, Archivas, EMC Centera, Pillar Data, and Permabit, as well as a host of WORM media-tape, UDO Magneto/Optical and PPD.

The system may also permit users to respond to anticipated regulatory proceedings or legal action by collecting and optionally content-indexing relevant production data in a user's mailbox or files and placing it on legal hold. This is done with the system's method for securing and indexing mailboxes and files. The system may also archive data using real-time collection from the Exchange Journal and other applications, and allows for the scheduled collection of both e-mail and files based on variety of metadata parameters.

In some examples, the system provides integration with NetApp SnapLock and other storage management applications. The system's ability to place relevant information on Legal Hold in conjunction with NetApp SnapLock on any NetApp storage system provides a high level of data protection and flexibility to suit e-discovery initiatives.

FIG. 9 is a flow diagram that illustrates a routine 900 for processing a response to a document retention request. In step 910, the system receives a request to retain documents. The request may identify particular documents, or it may contain criteria that can be used to identify relevant documents, such as a particular party's name, keywords, access criteria (e.g., documents accessed by the CEO of the company), and so on. The criteria may be provided by an information governance policy, which may for example, indicate that documents that satisfy particular classification rules and/or are associated with certain classification tags should be retained. In step 920, the system identifies documents relevant to the document retention request. For example, the system may use the search facilities described above to identify relevant documents, e.g., using the index 140. In step 930, the system places a hold on the identified documents, such as by setting a hold or undelete flag on the documents and/or by associating the identified documents with a certain classification tag. The flag or tag may prevent certain operations from being performed on the document, such as deleting the document or encrypting the document and/or may trigger other operations, e.g., in accordance with a retention policy. An undelete flag may be set on all copies of the document on various computers throughout the network in order to lock down all copies.

At step 935, the system may determine which persons or users are the custodians of the identified documents and notify those custodians that their documents have been placed on legal hold. In order to determine which users are custodians of a document, the system may utilize the index 140 and/or other system information to identify which users have created, modified, and/or accessed a document. The system may also access other data attributes or metadata, such as the location of the document. An information governance policy may define rules for determining which users are considered a custodian of a document. For example, an information governance policy may define a custodian as any person who has modified a file before a legal hold is implemented and/or as any person who controls or uses the client on which the document is stored.

At step 935, the system automatically notifies the identified custodians that their documents have been put on legal hold by an email notification, instant message notification, or similar. The notification provided may, for example, include an indication of which documents are on legal hold, the nature and/or duration of the legal hold, information about the custodian's legal obligations (e.g., a warning that the document should not be deleted), information about penalties for failing to comply with the legal obligations, and/or information about procedures for responding to the notification.

In step 940, the system may continue to monitor documents for changes relevant to the retention request. For example, the classification module 246 may determine if any new documents are created that are relevant to the retention request. The system may compare the documents with metadata, patterns of activity and other information related to the retention request. If additional documents are identified at step 940, the system may repeat blocks 930 and/or 935.

In some examples, at step 940 the system may also continue to monitor storage clients to determine whether a user has attempted to delete or edit production data that are relevant to the document retention request. For example, if a client has a document stored on it that is relevant to the document retention request, the system may monitor backup operations of that client. During a scheduled backup or other secondary storage operation, the system may determine whether the document has been edited, is no longer on the client's file system, has been moved to another location on the client's file system (e.g., the trash folder). Similarly, if the document of interest is an email, database entry or similarly granular data object, the system may determine if the data object has been edited, deleted or moved within a mailbox, database file, or similar file. To do so, the system may perform a comparison or difference of two backup files. Alternatively or additionally, the system may make the determination by utilizing other information related to a secondary storage operation, such as change reports, change logs, or change journals used during the operation. If the system determines that the file or object has been edited, deleted, or moved, the system may take additional action. For example, in accordance with a reporting policy, the system may notify a compliance officer of the change and/or include this information in a data management report to a compliance officer. As another example, the system may copy the document or data object to a secondary copy.

In step 950, the system generates a report that identifies the relevant documents identified and/or held via the process.

Although not shown, during the process 900 the system may also take other steps in accordance with applicable information governance policies. For example, in accordance with a workflow policy, for compliance purposes, the system may create a new archive copy that contains the identified documents. As another example, in accordance with a workflow and/or retention policy, the system may determine if the identified documents are production copies resident on a client 184 that have not yet been copied to secondary storage 123. In such an example, in accordance with the policy, the system May initiate storage operations, such as backup or archive operations, in order to create a secondary copy of the identified documents within secondary storage. As yet another example, in accordance with a workflow policy, the system initiates a data management workflow for processing the identified documents as a review set.

In some examples, the system handles all electronic data, and covers production volumes, online volumes (e.g., backup volumes), offline volumes (e.g., archives), third-party archives, and other versions of data. In its simplest form, a storage manager and data agents help identify data that satisfy a given criteria from various locations, and via indexes generated based on all data in a network. With a single user interface, a user can request a unified search over the network to identify all data satisfying predetermined criteria. This includes identifying data satisfying the criteria on multiple levels or tiers of storage, multiple types of media, and heterogeneous platforms.

In some examples, the system can employ Bayesian file matching techniques to identify similar files. For example, the system can identify data on a primary storage device identified from a storage manager index. The system can then identify where on the secondary tier of storage the similar data is located.

In some examples, the system locks down the data using a litigation hold field or undelete field that permits that data to be written once and read many times (WORM). The system works with data that is not regularly "WORM-able." In other words, the data can be tagged to be prohibited from being deleted, but then afterwards deleted when the flag is removed.

In some examples, the system permits indexing on each client, and the ability to trap data at a client level. For example, agent software on individual computers, coupled to the network, can monitor behavior on that computer, and when certain criteria are satisfied, write out everything elsewhere to a server on the network or other storage location. Alternatively, the data can be stored in cache, and then written out later, such as when the agent recognizes that the machine has been in a quiescent state for longer than a predetermined period of time, or at a predetermined time of day. Indeed, under this alternative, the agent can copy everything new that may have occurred on the computer and stored elsewhere.

Under another alternative that stops copies from being deleted, a filter on a primary storage device traps any delete commands associated with data matching certain criteria. Secondary storage may have a litigation hold field that is effectively an undelete flag or a "preventative action field." This field is more than a simple flag, but can identify or distinguish between different "matters" such as different litigations or other events. Further, such a preventive action field can selectively enable or disable delete commands, encryption commands, move commands, and so on. For example, certain data may be flagged as being kept encrypted permanently, unless certain special criteria are met. Alternatively, certain data may be flagged as prohibited from being encrypted. Further, data may be flagged whereby it may be moved only within a given data storage tier, and not between tiers. Any job agent running on the system, such as a journaling agent, can check for whether certain criteria are met, and take appropriate actions in response.

In some examples, the system has a reporting capability where indexes at the storage manager are analyzed to identify documents matching certain terms and reports generated therefrom. In other words, the system identifies data objects that meet search criteria. The system can then cross-reference back to other search criteria, without having to associate related items based on preset classifications or certain criteria. For example, documents assigned different matter numbers may be, in fact, related, and thus identified as related under the system.

In some examples, the system identifies not only documents, but also creates a log, and thus a log report, of keystrokes by given machines, applications opened, files stored, and so on. Differential reports may be generated through a differential search among multiple reports. Such a differential report can provide a rating based on a commonality between search results among different reports. The system may rate certain reports higher than other reports. For example, the system may rate activity from a computer that created the document higher than activity from the user that created the data. Also, the system may then use the differential report when performing dynamic processing, such as those described herein.

In some examples, once data identifying certain criteria is flagged, it can be sent to a WORM device or otherwise "WORMed." Under the present system, once data has been WORM-ed, it can be unWORMed later, which is not possible with some hardware-based storage systems.

Under another alternative, the system can trap a copy and store that copy elsewhere, such as on a completely separate machine. Thus, the system can create a storage manager index associated with a separately identified machine or platform to store all documents and other electronic data meeting an electronic discovery request or other present criteria. Thus, data can quickly be moved off a user's computer and onto a separate machine coupled to the network, where that machine may be dedicated to a certain job, such as legal discovery.

In some examples, using Vault Tracker or a similar archive storage management component, the system can perform a data classification search meeting the certain criteria, identify an offsite location storing the data, automatically request the offsite media, and restore it to a particular server. Thus, the system can automatically, or semi-automatically, obtain data meeting the certain criteria, and have it restored back at a set location to respond to a legal discovery request. For example, the system may identify documents using the search criteria and retrieve secondary storage devices that include the document and other documents related to the documents or its metadata.

Illustrative Legal Compliance Process

The system permits a very streamlined legal action workflow that allows for efficient and rapid processing of compliance requests, including discovery requests. The workflow allows the system to, in a first step, identify and filter relevant search result sets that highlight documents to be preserved. Using the tools noted herein, users can identify search terms and generate queries to submit to the system. For example, users may use the tools described herein to develop an information governance policy, including a classification policy, that defines various classification tags that appear to be responsive to a compliance request. Since data content indexing and classification is performed on all documents stored in the system, the system may quickly produce a review set of documents that may be responsive to a legal hold or discovery request.

In a second step, the system allows users to manage the manual annotation and content classification of documents reviewed against defined legal matter characterizations or classifications (e.g. privileged documents). For example, users can quickly review documents to determine whether they are relevant and responsive to a discovery request, whether they are privileged, and so forth, for example using the collaborative systems described herein. Users can associate tags with such documents to help flag them for quick and automated processing by the system to create an archive data set that can be preserved through the course of a compliance matter, such as a E-discovery matter, and so forth.

Under a third step, the system automatically legally holds or physically secures archived copies of certain documents based on their classification (possibly encrypting the documents also). Thus, in accordance with a retention policy, documents that have been flagged or associated with specific classification tags may be copied to create a new copy set (archive copy), and such documents may be indexed, as well as possibly being encrypted, deduplicated, and so forth, as noted herein.

Under a fourth step, in accordance with a retention policy, the system can redirect legally held content to a document review process, a specific case management technology (e.g. CaseCentral), or export it for ingestion into an in-house litigation system. For example, the flagged/tagged documents can be forwarded as a copy set to attorneys for review and use during litigation, reports (noted herein) may be generated, and so forth.

FIG. 10 is a block diagram illustrating an example electronic discovery process. Although described in the context of an electronic discovery task, some or all of the steps shown in the process may be performed in conjunction with other compliance workflows, such as Sarbanes-Oxley compliance workflows.

After first determining whether litigation is reasonably anticipated, the system can stop aging data under block 1002. For example, using a unified dashboard or user interface, a legal compliance officer, attorney, administrator or user may temporarily hold any aging out of data to prevent, temporarily, data from being deleted or overwritten, such as tapes having archived copies of documents being recycled and overwritten. To do so, the user may define a retention policy that forbids the deletion or encryption of data that matches certain classification rules or other criteria. The system extends or postpones any retention attributes or time periods associated with data copy jobs to prevent data deletion or encryption by unauthorized users. Specifically, at the direction of the retention module 240, the storage manager 210 may modify the appropriate entries in the data base 213 to ensure such jobs are not deleted.

If the "key players" or other relevant individuals associated with the litigation are still employed or still generating documents with the company named in the litigation, then under step 1004, the system may, in accordance with an information governance policy, enable active archiving and/or indexing of any electronic documents generated by such key players. For example, at step 1004, the system may automatically move mailboxes associated with key players to a journaled mail store or mail store that tracks all sent and received mails by these key players to ensure that those e-mails are copied, indexed and archived. These e-mails may also be content indexed as described herein. In addition to tracking or journaling emails, the system may also track, journal, archive, and/or index other types of files or any other electronic documents associated with these key players.

Under step 1006, in accordance with a workflow or retention policy, the system preserves active production data and all secondary stored data that are associated with the key players and/or specified data classification tags. The system may, for example, create a copy or archive file of each key player's mailbox to ensure archiving of e-mail messages, of each file created, modified or even accessed by the key players and preservation of all other documents associated with the key players and/or specified classification tags. For example, by accessing the file system via file system APIs, the system can, via journaling of metadata, monitor all files created, edited, accessed, etc. by the key player to ensure archiving of file system documents for the key players. This file system copying can include not only file shares on a server, but also desktop and laptop electronic document preservation by installing file system agents on the desktop and laptop computers for the key players, where the agents monitor access to files and perform the data classification noted above. Under step 1006 the system can also search archive copies for any electronic information associated with the key players or specified classification tags and copy that information to a dedicated archive. The system can also search the index to identify relevant documents that match data classification rules (e.g., match certain key words). For example, in accordance with a classification rule, the system may search the index 140 for any documents associated with a product name or internal development name, where that product is identified in a lawsuit or potential lawsuit. The system may then tag these documents and preserve them.

Under step 1008, in accordance with a retention policy, the system duplicates one or more backup or copy sets. Thus, as noted above, the system can automatically create a case-specific copy set or archive copy that allows the organization to hold only relevant information, thus eliminating the need to hold a single tape that could have multiple data sets of discoverable information. Thus, this copy set can include mail server information (e.g. e-mails), file system information (e.g. electronic documents or files), and other information (e.g. database information, web pages, browser history).

Under block 1010, in accordance with retention policies, the system may resume data aging by removing the extended retention flag set under block 1002. Thus, for example, previously held/retained tapes may be overwritten. Under block 1012, in accordance with an information governance policy, the system begins to perform initial production from the archived data or legal hold copy set to thereby generate an initial discovery copy set that is a subset of the collected and legally held copy set. For example, the system may provide the legally held copy set (or a subset thereof) to the collaborative search and workflow module 241. Having previously indexed content in this legally held copy set, users can use the search and other workflow features noted herein to quickly and efficiently search, review, tag, annotate, and protect relevant documents.

Under block 1014, the system can, in accordance with a workflow policy, optionally produce from the backup set some or all documents needed to respond to a discovery request, thereby creating a subset of the legally held copy set, where the subset of documents may be provided to opposing counsel in a lawsuit, to a court in a court proceeding, to a governmental agency, etc. For example, the system may perform a query of the documents in the archive copy or legally held copy set created under step 1008 to identify all documents that were tagged during the review workflow as relevant and responsive to a discovery request, but that are not privileged. The system, in accordance with a retention policy, may then create a copy of that subset of documents, such as on a magnetic tape, and export that tape as needed.

Not only can the system export the relevant copy set in response to a court order, but it can also automatically identify a reduced number of electronic documents and create a discoverable copy set that is a subset of the documents stored and preserved under step 1008. The system uses filters to enable users to quickly identify and reduce the number of files and messages needed for review or needed to be produced, to thereby allow business teams to make better decisions, meet deadlines, avoid sanctions, etc.

Dashboard: Reporting and Intelligence

The system may provide various types of reporting to assist in electronic discovery and other legal compliance tasks. Such reports can be used by IT and compliance personnel for decision making. The reports may be generated by the reporting module 244 in accordance with a reporting policy, as described herein. Users may access these reports from a unified dashboard or graphical user interface ("GUI"), such as the GUI 800 shown in FIG. 8.

As a first example, a report 840 may indicate the degree to which certain classes or locations of data have been indexed. For example, as shown, the report may provide this information for different classes of storage locations (e.g., production data, secondary data, third-party archive data). As a second example, a report 845 may indicate the quantities of data objects that have been tagged with various classifications of interest to the user. Alternatively, or additionally, a similar report might indicate the number of data objects currently in various review sets that are of interest to the user.

As another example, a report 860 might indicate the degree to which an organization's current storage operations are compliant or noncompliant with a particular regulation. Such reports may compare the current and/or historical state of the organization's data to various benchmarks or goals that might be defined by a reporting policy and/or retention policy. For example, a report might indicate that 5% of data that is tagged as "patient confidential" is stored in unencrypted form. If HIPAA requires that less than 2% of patient confidential data is stored in unencrypted form (i.e., 2% is the applicable performance benchmark), then the report might also indicate that the organization is in violation of HIPAA and provide an indication of the level and nature of its non-compliance. Such a report may help a decision-maker detect regulatory non-compliance and identify the improvements that are necessary to remedy non-compliant features of an organization's storage systems.

Figure 8:
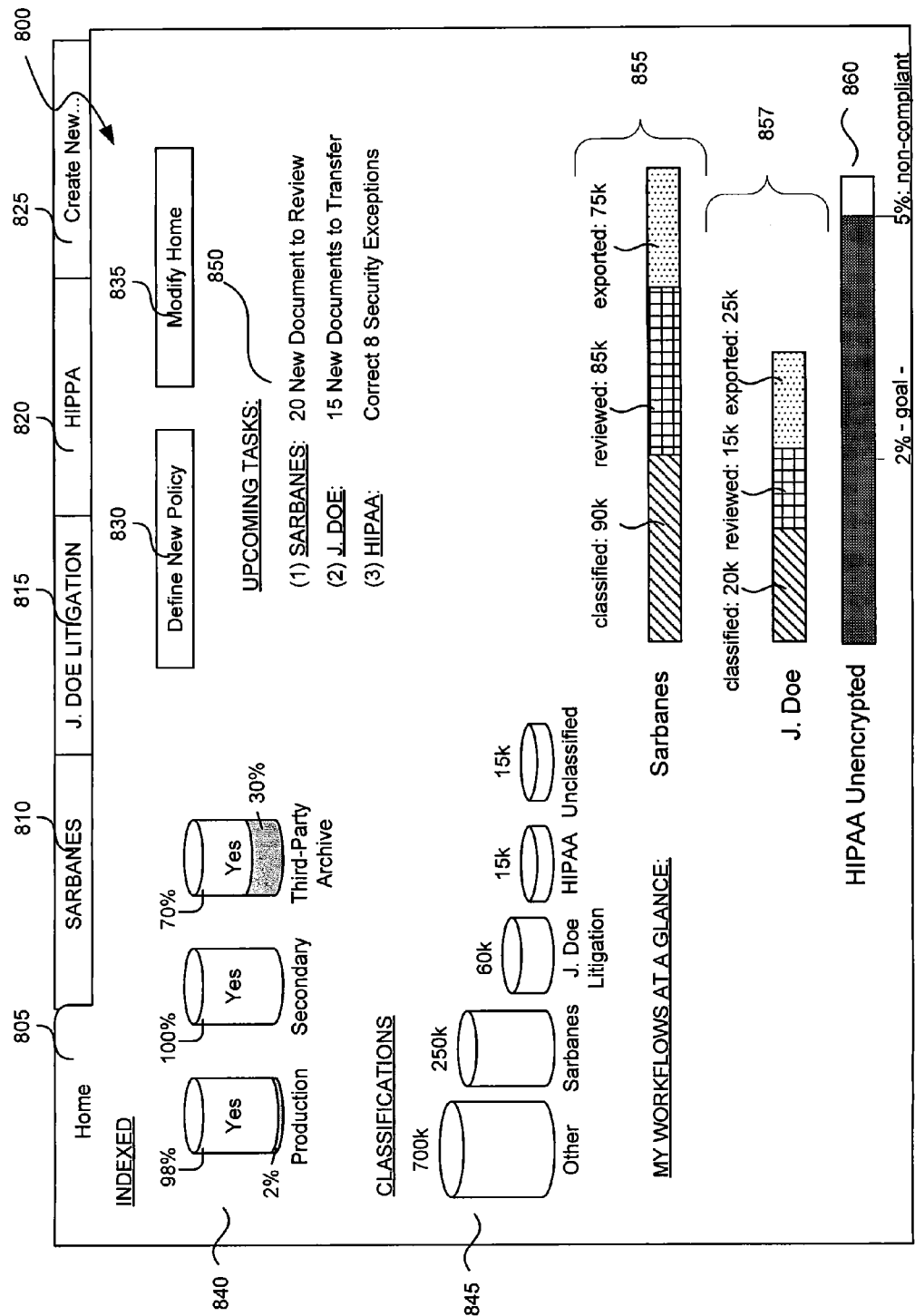
FIG. 8 is an example of a dashboard graphical user interface.

As another example, as shown in FIG. 8, the system may generate graphical or other workflow reports 855, 857 that indicate the progress of data through a particular workflow. For example, as shown in FIG. 8, a report 855 may indicate, e.g., using stacked bar charts, what proportion or quantity of documents that are potentially relevant to a particular workflow have been (1) added to the review set based on data classification and/or queries (e.g., 90,000 documents), (2) fully reviewed in the specified workflow (e.g., 85,000 documents), and/or (3) exported, e.g., to opposing counsel (e.g., 75,000 documents). As another example, for an E-discovery workflow, such a report may indicate that 80,000 documents have been automatically tagged as "responsive" to a compliance request based on an applicable classification policy; 70,000 of those tagged documents have been pushed to a review set and entered a collaborative workflow specified by a workflow policy; 20,000 have received a primary review by an associate within the workflow; 500 have received a secondary review by a partner within the workflow, 200 "top-secret" documents were sent directly to in-house counsel, and 100 have been tagged as "responsive" and "non-privileged" and thus exported to opposing counsel.

As another example (not shown), the system may generate an audit-ready report that identifies what electronic data the system could and could not find during a compliance task, such as when responding to a discovery request. For example, the report may identify all of the documents responsive to a legal discovery request as well as the current availability of those documents within the system. The documents can then be accessed if they are online or retrieved from a storage library and accessed if they are offline (e.g., stored in an off-site data vault). The report may be useful in cases where an organization prepares for a discovery or other compliance request but does not want to devote the resources in preparing the data. Additionally, the system may use such a report to proactively identify problems with a data retention system should the report indicate that some data was not found or is not stored in compliance with applicable record-keeping regulations. For example, the system may identify that all data from a certain time period was not found, and review various processes that stored data in that time period for errors and/or malfunctions. Thus, the system may proactively prepare for compliance requests using aspects of the system.

As another example (not shown in FIG. 8), a report may also provide additional aggregate or summarizing information to aid with decision making. For an example, a report can be used to analyze and weigh the costs of settling versus the costs of discovery via various metrics. For example, lawyers and management can analyze the cost of responding to discovery requests in a lawsuit by assigning an average hourly rate and an average time per document review in a reporting policy. The system can then identify the number of documents that satisfy a discovery request using the search criteria and tools noted herein. Based on the number of documents, the average hourly rate, and the average time to analyze a document, the system can automatically compute and generate a report indicating the cost to respond to a discovery request.

For example, if the system identifies 50,000 documents that may be potentially relevant to responding to a discovering request, and an average of 0.1 hours will be spent analyzing each of those documents to determine whether a given document is relevant and whether it is privileged, at an average hourly rate of $250 an hour, the cost to analyze those documents would be $1,250,000. This high cost can then be used by management to determine a reasonable rate to settle a piece of litigation to avoid costly discovery.

Further details regarding assessing costs, particularly for information technology (IT) and data storage expenses may be found in the assignee's U.S. Pat. No. 7,343,356, issued Mar. 11, 2008, incorporated herein by reference.

As another example (not shown in FIG. 8), in accordance with a reporting policy, during a scheduled backup or other secondary storage operation, the system may determine whether a production copy of a document that is associated with specified classification tags and/or review sets has been edited, is no longer on the client's file system, has been moved to another location on the client's file system (e.g., the trash folder). Similarly, if the document of interest is an email, database entry or similarly granular data object, the system may determine if the data object has been edited, deleted or moved within a mailbox, database file, or similar file. To do so, the system may perform a comparison or difference of two backup files from two different time points. Alternatively or additionally, the system may make the determination by utilizing other information related to a secondary storage operation, such as change reports, change logs, or change journals used during the operation. If the system determines that the file or object has been edited, deleted, or moved, the system may take additional action. For example, in accordance with a reporting policy, the system may notify a compliance officer of the change and/or include this information in a data management report to a compliance officer. As another example, the system may copy the document or data object to a different secondary copy.

Of course, the various reports described herein may provide data management information in any suitable textual, audio/visual, tabular, or graphical form, (e.g., using charts, graphs, and other types of figures). Those examples provided above and in FIG. 8 are intended to be illustrative, not exhaustive.

The GUI 800 may provide a user with means 835 for modifying or customizing the content and/or format of the various reports displayed on the GUI. For example, by clicking on the button marked "Modify Home," the user may be able to add, delete, or modify the reports displayed on the dashboard. The user's ability to do so may be limited by applicable security policies; for example, a user may only be able to add reports pertaining to workflows for which the user is an authorized member.

Dashboard: Workflow Management

The GUI 800 may also provide a user with means 830 and 825 for defining a new information governance policy so that she may establish a workflow for a new compliance task. For example, by clicking on the button marked "Define New Policy," a user may be provided with an opportunity to build a policy for a new E-discovery workflow that is necessitated by a new lawsuit. In some examples, the GUI 800 may guide the user through the policy creation process using templates, as described above.

In addition to reports, the dashboard GUI 800 may also provide access to the various workflows in which the user participates or acts as an administrator, e.g., via links or tabs 810, 815, and 820. For example, the GUI 800 may provide a tab 810 for a search interface used to generate a review set or similar data set, e.g., a set that is related to a Sarbanes-Oxley workflow. Example search interfaces are described below. As another example, the GUI 800 may provide a tab 815 so that the user may review, annotate, and otherwise process documents in a review set (e.g. a review set related to litigation brought by J. Doe) as described previously.

Additionally, the GUI 800 may provide a summary 850 about the current status of various workflows in which the user is a participant or administrator. For example, as shown, the summary may provide an indication of the user's upcoming tasks in a workflow, new documents that have been added to a review set, and/or compliance issues (e.g., exceptions) that have been identified during a workflow.

In addition, an administrator may also access (e.g., from a dashboard, such as the one shown in FIG. 8) audit-ready reports related to the evidentiary or other integrity of content (chain-of-custody) of individual documents and/or data sets, such as a production set that satisfies a compliance request. An example of a chain of custody report is shown in FIGS. 11A through 11C, which is in the form of a spreadsheet, although of course other forms are possible. In these figures, each row continues from one figure to the next. The report includes three sample files or documents, which may be emails (items 1 and 3) or a document (item 2). The report includes several self-explanatory labels along the top, with each row underneath providing associated metadata for the corresponding file/document. For example, as shown, the report may include columns for, among other things:

- creation time,
- modification time(s),
- location within a data storage system or another location (e.g., off-site storage),
- custodians,
- details regarding how the document was copied to secondary storage and/or indexed (i.e., "ingested" by the system),
- "teaser information" that indicates file contents, and may also indicate why the file was tagged or classified in a particular manner,
- associated classification tags (either automatically or manually added tags),
- keywords and other information related to the search query or classification policies that produced the document (e.g., a user and host that generated a query or classification policy), and
- details of how the document has been preserved or otherwise exported in compliance with a retention policy (e.g., when the document was exported to a dedicated case-specific archive file, the location of that archive file, the storage conditions of the archive file).

Additionally, although not shown, a chain of custody report may also show other information, such as a list of all users who have created, accessed and/or modified a document; a description of any modifications made to the file (including, for example a description of system-implemented modifications such as the removal of a virus or a file format conversion). The chain of custody report may also indicate the provenance of a file or document, e.g., by indicating which documents were predecessor versions or formats of the same file or document. As another example, the report may indicate how a file or document has moved through various storage locations and/or storage media (e.g., from disk, then to an on-site tape library, and then to an off-site tape storage location). The content of a chain of custody report may be defined in part by a reporting policy.

Searching, Navigating and Recovery User Interfaces

Figure 13:
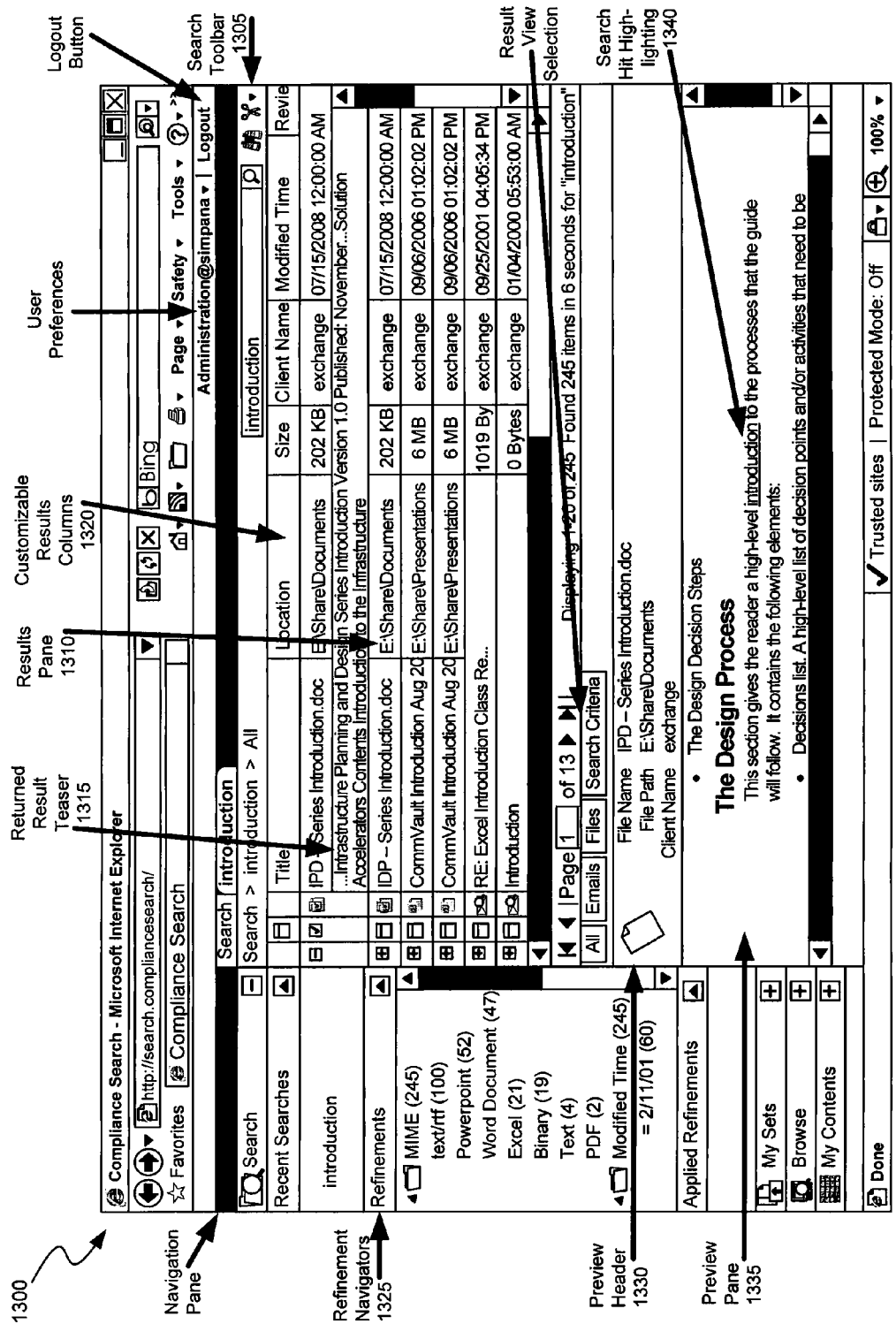

FIGS. 13-16 are screenshots of an example GUI for searching, navigating, and recovering data that is distributed across a storage system, including primary and secondary copies and online and offline copies. As shown in FIG. 13, the GUI 1300 may include a search toolbar 1305 for building a search query and a results pane 1310 that shows the various search results that are responsive to a search, e.g., in a tabular format. The search toolbar may facilitate different kinds of searching, including for example, Boolean (exact, criteria matching), proximity (relative terms/placement), lemmatization (meaning based content), fuzzy approximation, parametric/clustering (search navigators which cluster by classification/frequency), entity/categorization (prescribed classification, tags), latent semantic analysis, synonym search (similar terms).

The search results in the results pane 1310 may be ordered by a relevancy rank, wherein the relevancy rank is not determined solely by the frequency of search keywords and phrases in each search result. Instead, the relevancy rank may alternatively or additionally be determined by whether the specified keywords or phrases appear at a place of prominence within the search result. For example, consider if two search results both contain the search keyword "cat." In the first document, the keyword "cat" might appear twice in the general body text of the file. In the second document, the keyword "cat" might appear once in a subject line, file name, table of contents, a specially-formatted header, or another similar place of prominence. In such an example, the results pane might promote the second document over the first document, since the search keywords or phrases appear in a place of prominence.

In some examples, a search cache is maintained by the system. For example, when a document is retrieved via a search interface (e.g., retrieved from secondary copies), a copy of the document may be stored temporarily in a primary storage search cache that is readily accessible to the search server. The system may track how frequently the cached copy is accessed by users. The system may maintain the cached copy of the document for some period, wherein that period may be determined in part by the frequency with which the cached document is subsequently accessed via a search interface. For example, if a user retrieves a copy of a document from the search interface on Friday, and she and/or other users subsequently accesses the cached copy of the document every day for two weeks, the system may maintain the cached copy for three weeks before deleting the copy from the cache. Maintaining a search cache in this manner reduces the overhead of retrieving search results from the search interface.

As shown, each search result in the results pane 130 may be shown in conjunction with descriptive columns 1320 (e.g., for title, location, size, client, modification time, or other metadata). The columns used may be customized by a user. The results pane 1310 may also include teaser information that provides an indication of the content of a search result. The GUI 1300 may further include refinement navigators 1325 that permit a user to quickly drill down on search results using additional limitations or filters, such as keywords/phrases, entities, file or content type, date or time ranges (e.g., modification times), classification tags, and/or other criteria. The GUI 1300 may also include a preview pane 1335 for the currently selected search result. The preview pane 1335 may include a preview header 1330 with identifying information or metadata such as the file name and client name. The preview pane 1335 may also indicate how the search result matches search criteria, such as keyword criteria using highlighting 1340 or other formatting.

As shown in FIG. 14 the GUI may also provide a mechanism of searching for entities, as described previously. As shown in FIG. 15, the GUI may also provide an advanced query builder that permits a user to build an advanced multi-field search query using drop down or similar menus to select common search fields 1505 (e.g., metadata fields) and then associate each field with a search criteria. The GUI may also permit the user to aggregate various search fields and search criteria using drop down or similar menus 1515 and 1510 that specify query connectors (e.g., such as logical connectors like "AND" or "OR" or range specifiers such as "Between" or "After").

Figure 16A:
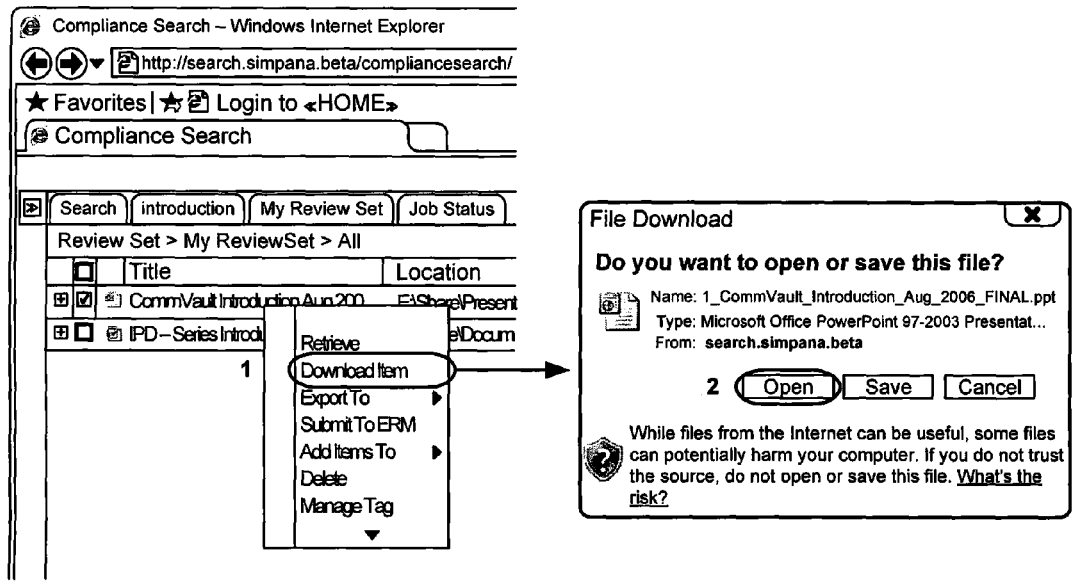
Figure 16B:
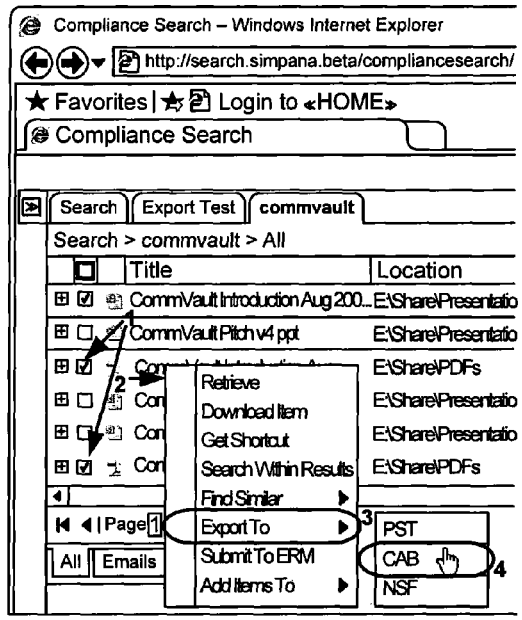
Figure 17:
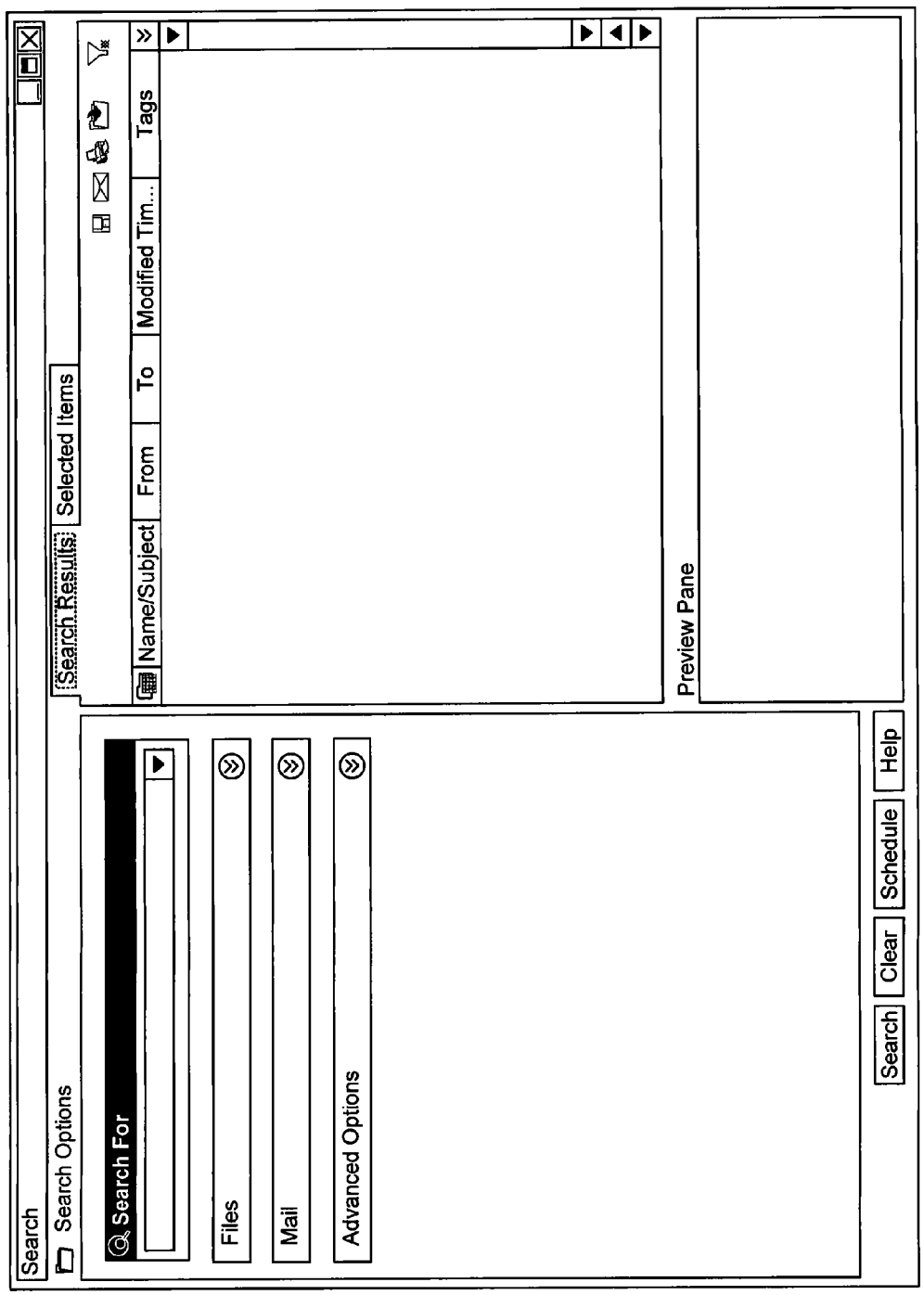
Figure 21:
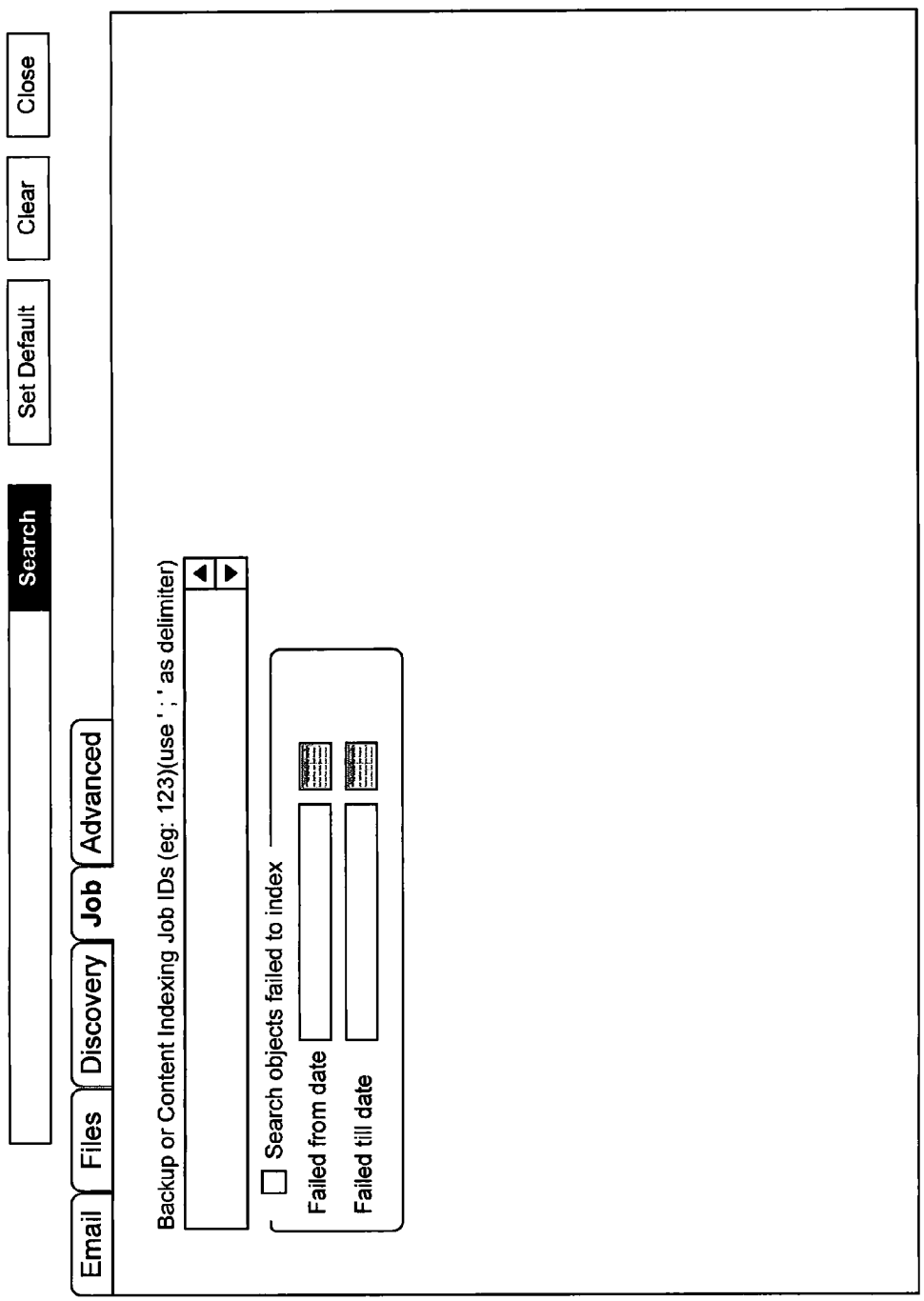
Figure 22:
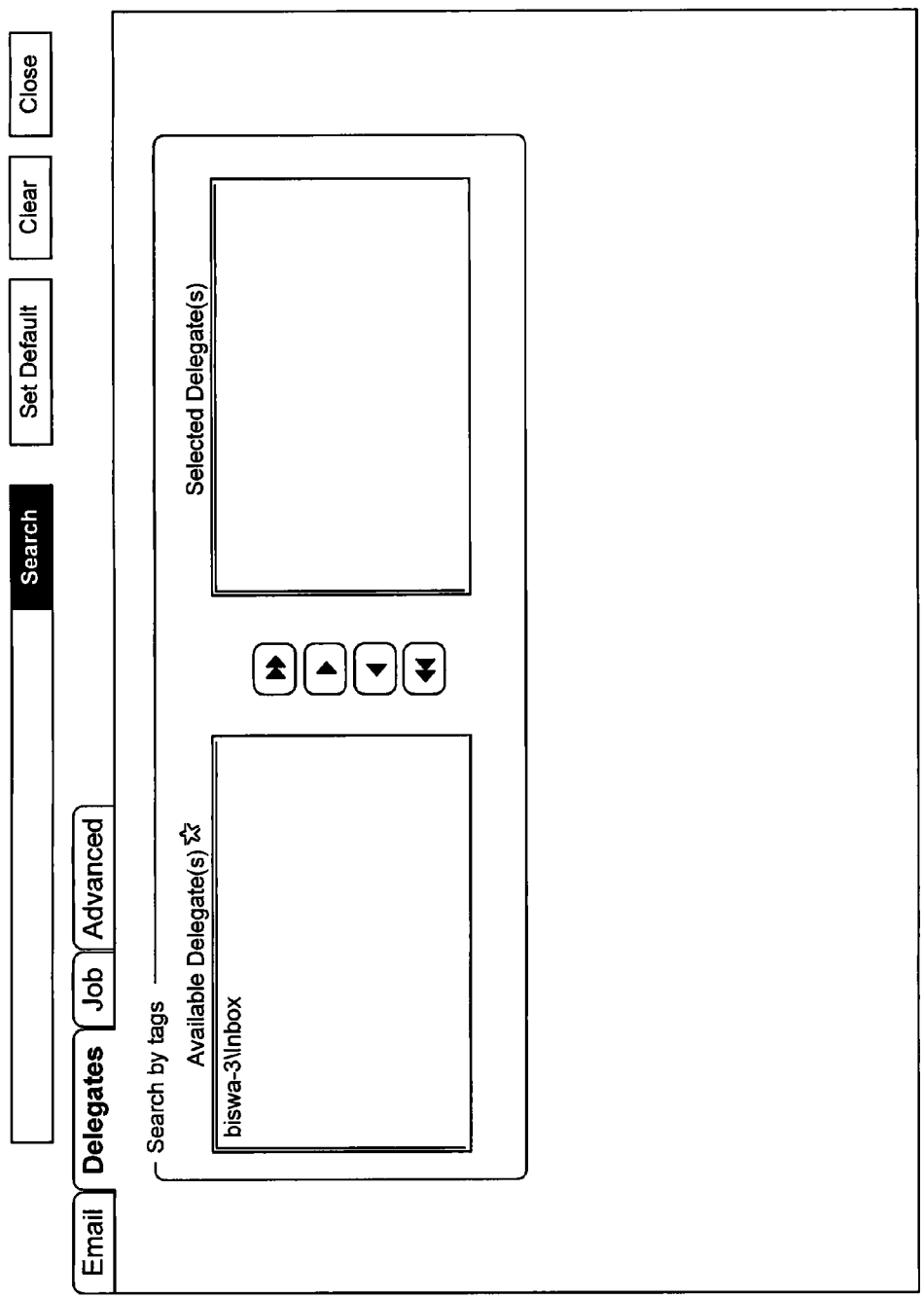
Figure 23:
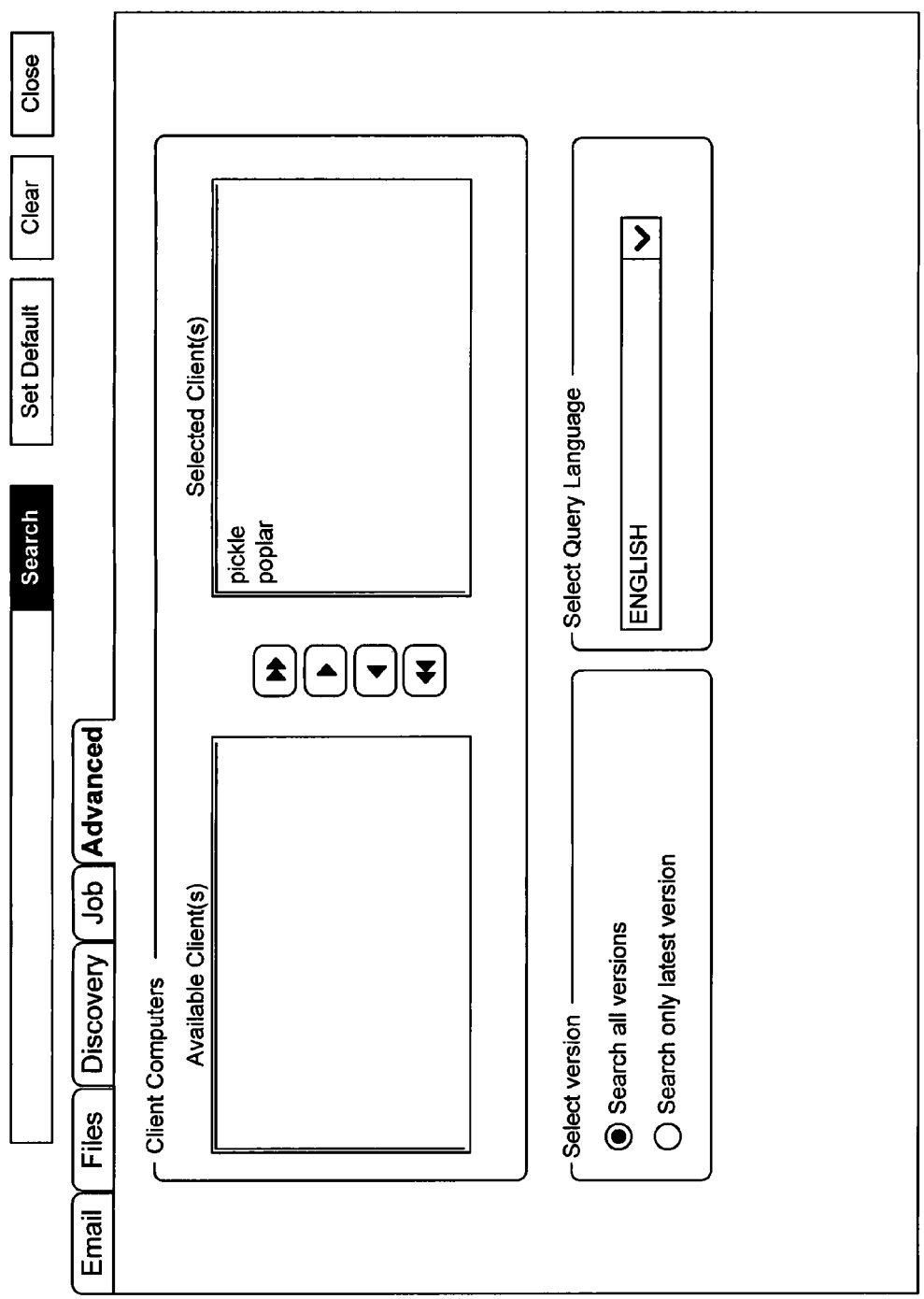
Figure 24:
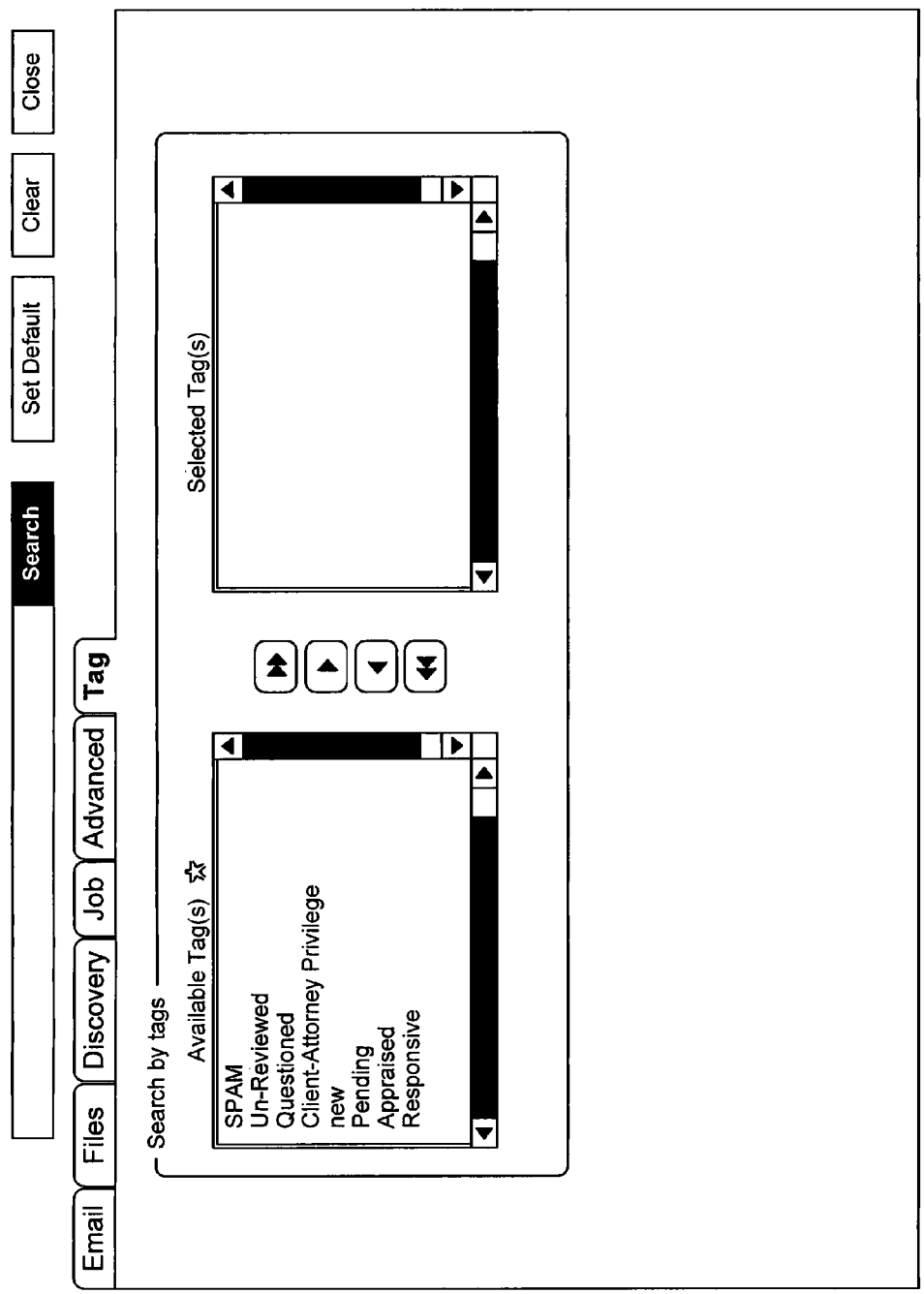

As shown in FIG. 16A, in addition to search capabilities, the GUI may also provide the ability to open or download a single search result using a simple right-click or similar one-click method. As shown in FIG. 16B, the GUI may also permit the user to select multiple search results to export to a particular output file. If the user selects either a download or export, the system may retrieve the one or more search results, e.g., from various secondary or primary storage locations within the data storage system.

Figure 12:
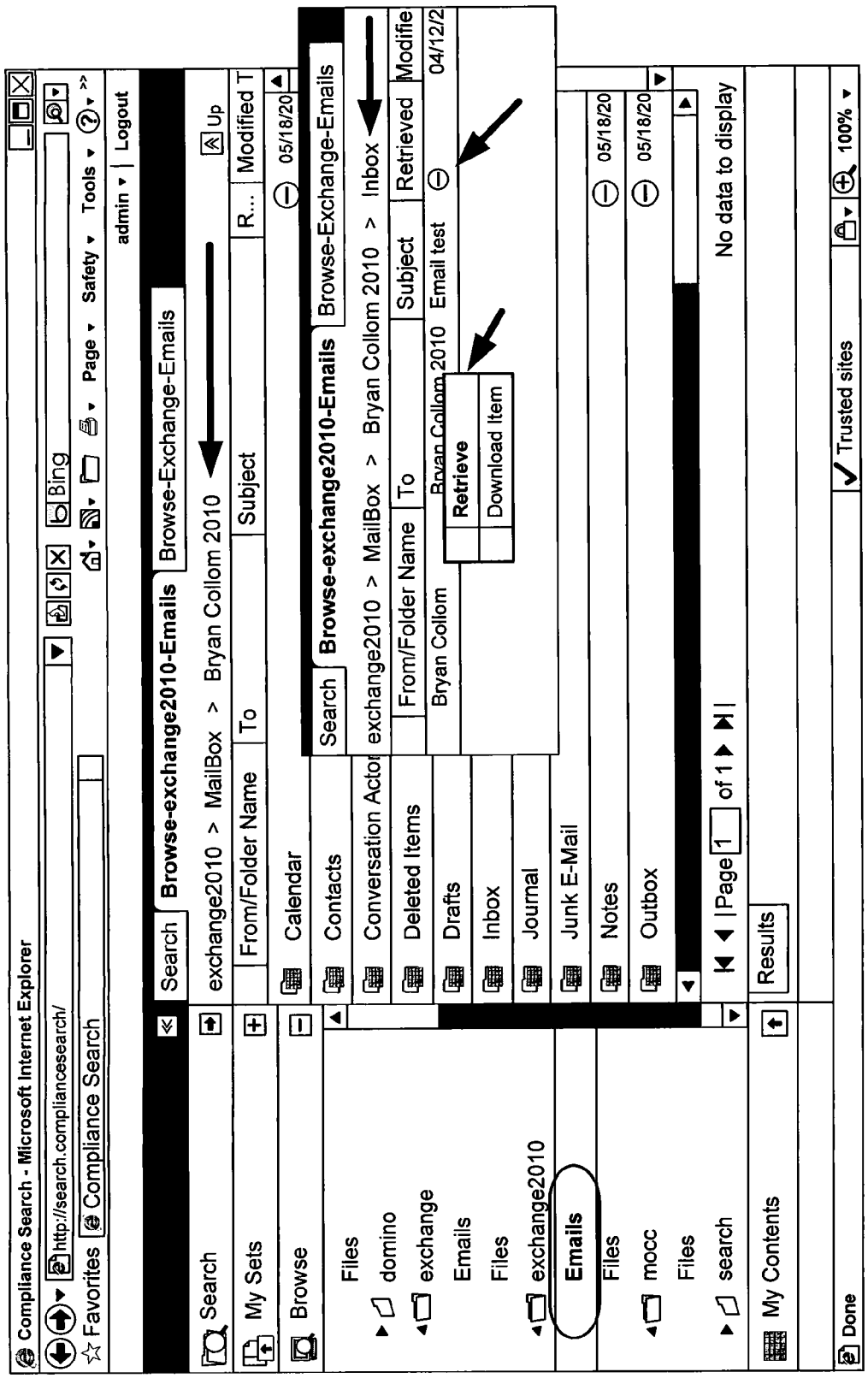

As shown in FIG. 12, in addition to facilitating search queries, the GUI may permit a user to browse all of an organization's data that is stored in primary and/or secondary copies (e.g., archive or backup) via a consolidated and hierarchical folder structure.

Although not shown in FIGS. 12-16, in some examples, a user may be able to specify a particular point-in-time and the search results and/or browsing information displayed in FIGS. 13 and/or 12 may reflect the state of the organization's data as it existed at a particular point in time, including both production and secondary data. In this way, a user may obtain a "time-machine" view of an organization's data. Additionally, although not shown in FIGS. 12-16, in some examples, via the GUI, a user may be able to view a visualization showing the timeline of how an email object progressed through an email exchange. For example, the timeline may show how various users forwarded and/or replied to a particular email during a specified time period.

FIGS. 17-27 are screenshots of another example of a GUI for searching. These screenshots are generally self-explanatory.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

This application also incorporates by reference the following patent applications herein in their entirety:

- U.S. patent application Ser. No. 11/564,197, filed Nov. 28, 2006, entitled "SYSTEMS AND METHODS FOR CLASSIFYING AND TRANSFERRING INFORMATION IN A STORAGE NETWORK", now U.S. Pat. No. 7,734,593,
- U.S. patent application Ser. No. 11/950,376, filed on Dec. 4, 2007, entitled SYSTEMS AND METHODS FOR CREATING COPIES OF DATA, SUCH AS ARCHIVE COPIES,
- U.S. patent application Ser. No. 11/963,623, filed on Dec. 21, 2007, entitled SYSTEM AND METHOD FOR STORING REDUNDANT INFORMATION,
- U.S. patent application Ser. No. 11/966,842, filed on Dec. 28, 2007, entitled SYSTEM AND METHOD FOR ENCRYPTING SECONDARY COPIES OF DATA,
- U.S. patent application Ser. No. 61/001,485, filed on Oct. 31, 2007, U.S. Provisional Patent Application No. 60/868,518, filed on Dec. 4, 2006, entitled METHOD AND SYSTEM FOR RETENTION OF DOCUMENTS,
- U.S. patent application Ser. No. 11/694,869, filed on Mar. 30, 2007, entitled METHOD AND SYSTEM FOR OFFLINE INDEXING OF CONTENT AND CLASSIFYING STORED DATA,
- U.S. patent application Ser. No. 11/564,119, filed on Nov. 28, 2006, entitled SYSTEMS AND METHODS FOR CLASSIFYING AND TRANSFERRING INFORMATION IN A STORAGE NETWORK,
- U.S. Patent Application No. 60/852,584, filed on Oct. 17, 2006, entitled "METHOD AND SYSTEM FOR COLLABORATIVE SEARCHING"
- U.S. Patent Application No. 60/868,518, filed on Dec. 4, 2006, entitled "METHOD AND SYSTEM FOR RETENTION OF DOCUMENTS", and,
- U.S. Patent Application No. 60/882,884, filed on Dec. 29, 2006, entitled "SYSTEMS AND METHODS FOR CREATING COPIES OF DATA, SUCH AS ARCHIVE COPIES".

The teachings of the technology provided herein can be applied to other systems, not necessarily the system described above. The elements and acts of the various examples described above can be combined to provide further examples. Any patents and applications and other references noted above, including any that may be listed in accompanying filing papers, are incorporated herein by reference. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A system to provide data management services, wherein the system is communicatively coupled to at least one client computer and at least one third party server computer, the system comprising:

a data storage system coupled to the at least one client computer via a local area network and to the third party server computer via a wide area network or public computer network, wherein the third party server computer is associated with a company or organization unaffiliated with a company or organization controlling operation of the data storage system, and, wherein the data storage system includes:

at least one server computer, at least one data storage device, and a retention component configured to receive data objects from the at least one client computer, wherein the data objects from the at least one client computer are associated with a first format, receive data objects from the third party server computer, wherein the data objects from the third party server computer are associated with a second format, wherein the first and second formats differ, and apply respective first and second retention policies to the data objects in the first and second formats to store the data objects in the at least one data storage device according to the first and second retention policies, and wherein at least one of the first or second retention policies requires received data objects be de-duplicated, encrypted, or both de-duplicated and encrypted, and wherein the received data objects are not converted to another format;

a data classification component configured to content index and classify the data objects in the first and second formats;

a search component configured to permit searching via the at least one client computer and the third party server computer of the data objects of the first and second formats, respectively, wherein the search component is further configured to apply searching restrictions or access control based on securities policies, and without need for data agents on the at least one client computer or on the third party server computer; and, a reporting component configured to provide reports based on search results provided by the search component, wherein the data storage system is further configured to:
- calculate a hash value for a newly received data object,
- determine that the calculated hash does not match a previously stored hash for a previously stored copy of the data object, and
- report that contents of the data object have changed.

2. The system of claim 1 wherein the data storage system is further configured to provide a chain-of-custody report that identifies that contents of the data object have changed.

3. The system of claim 1 wherein the data storage system is further configured to update an index to indicate that a particular data object has moved among different storage locations or among different storage media,
- wherein the index maintains a referential model to provide an audit trail that links metadata for the particular data object to an original data object, without need for maintaining the original data object in the data storage device, and
- wherein the reporting component is configured to provide a chain-of-custody report based on the updated index, wherein the report includes an audit trail to show, using metadata, differences between data objects to ensure integrity as data objects are converted from one format to another format.

4. A non-transitory computer-readable storage medium whose contents cause a data storage system to perform a method for processing a document retention request, the method comprising:
- receiving a request to retain documents that match specified criteria;
- automatically identifying documents stored within the data storage system that match the specified criteria;
- placing a hold on the identified documents by automatically associating each of the identified documents with an undelete flag;
- automatically monitoring the data storage system to identify new documents that match the specified criteria; and,
- automatically associated each of the new documents with the undelete flag,
  - wherein the data storage system is configured to prevent a user from deleting a document that is associated with an undelete flag and
  - to prevent a user from encrypting a document that is associated with an undelete flag; and
- determining a custodian of an identified document by analyzing metadata associated with the identified document in accordance with an information governance policy; and,
- automatically and electronically notifying the custodian of the identified document that the identified document is subject to a retention request.

5. The non-transitory computer-readable storage medium of claim 4, wherein the method further comprises:
- after litigation is reasonably anticipated, determining if the user is still employed with a company or generating documents; and,
- automatically and electronically notifying the custodian that the identified document was attempted to be deleted, modified or encrypted.

6. The non-transitory computer-readable storage medium of claim 4, wherein the method further comprises electronically notifying a custodian of an identified document that the identified document is subject to a legal hold.

7. The non-transitory computer-readable storage medium of claim 4, wherein:
- the data storage system manages production copies of data, online secondary copies of data, offline secondary copies of data, and third-party archive data;
- the data storage system includes an index that stores metadata associated with the production copies of data, online secondary copies of data, offline secondary copies of data, and third-party archive data; and,
- wherein identifying documents stored within the data storage system that match the specified criteria comprises searching the metadata stored in the index.

8. The non-transitory computer-readable storage medium of claim 4, wherein:
- the data storage system manages production copies of data and online secondary copies of data;
- the data storage system includes an index that stores metadata associated with the production copies of data and online secondary copies of data; and, wherein identifying documents stored within the data storage system that match the specified criteria comprises searching the metadata stored in the index.

9. The non-transitory computer-readable storage medium of claim 4, wherein the method further comprises:
- determining that an identified document is a production copy located on a client, and that the identified document has not been copied to a secondary copy in secondary storage; and,
- copying the identified document from the client to a secondary copy in secondary storage.

10. A method for performing a regulatory compliance task in a data storage system, the method comprising:
- receiving a definition of an information governance policy, wherein receiving the definition of the information governance policy includes
  - receiving a definition of a workflow policy that specifies a process of steps to identify and handle a set of documents in the data storage system,
    - wherein the process of steps are defined at least in part by the classification tags, and
    - wherein the definition of the workflow policy facilitates collaborative workflow by defining a first workflow task for at least a first user, and defining a second workflow task for at least a second user; and
- wherein receiving the definition of the information governance policy further comprises at least two of the following:
  - receiving a definition of a classification policy, wherein the classification policy defines classification tags relevant to a compliance task, wherein the classification tags are for association with specified documents;
  - receiving a definition of a reporting policy, wherein the reporting policy specifies a set of reports to provide to a user via a graphical user interface regarding a status of documents stored in the data storage system; and,
  - receiving a definition of a retention policy, wherein the retention policy specifies the manner in which documents should be stored within the data storage system, and wherein the retention policy is defined at least in part by the defined classification tags; and, performing a compliance task with received documents in accordance with the received information governance information policy.

11. The method of claim 10, wherein at least one of the defined classification tags is an entity tag that is associated with data content in a document that matches a specific data mask format.

12. The method of claim 10, wherein the workflow policy specifies that
   the set of documents should be exported to a dedicated archive file; or,
   custodians of a document in the set of documents should be notified that the document is not to be deleted.

13. The method of claim 10, further comprising generating in the graphical user interface, in accordance with the reporting policy:
   a report that indicates whether data in the data storage system is stored in compliance with a regulation, and wherein compliance with the regulation is determined in part by a specified performance metric;
   a report that indicates how the set of data objects has progressed through stages of a workflow defined by the workflow policy; or,
   a report that indicates a quantity of data objects in the data storage system that match a classification tag defined by the classification policy.

14. The method of claim 10, wherein a user provides the received definition of an information governance policy via a policy template.

15. The method of claim 10, further comprising:
   receiving an indication of a previous point in time from a user; and,
   presenting in the graphical user interface an indication of the state of data in the data storage system as it existed at the indicated previous point in time.

16. The method of claim 10, further comprising detecting that a file stored on a client computer that matches a defined classification tag has been deleted, wherein the system detects the deletion by comparing two different data copy operations of the client that occurred at different times.

17. The method of claim 10, further comprising receiving a modification to the retention policy in response to changed regulatory retention requirements.

18. The method of claim 10 wherein the information governance policy is related to electronic discovery for a legal action, Sarbanes-Oxley reporting/auditing, or Health Insurance Portability and Accounting Act (HIPAA).

19. The method of claim 10, further comprising indexing content of production data before secondary copy operations are performed, and associating a tag with a selected document in the production data to prevent deletion or encryption of the selected document.

20. The method of claim 10, further comprising providing access to indexed content of off-line copies of data, wherein the off-line copies of data stored on magnetic tape and not available by the data storage system via a network.

* * * * *

UNITED STATES PATENT AND TRADEMARK OFFICE
CERTIFICATE OF CORRECTION

PATENT NO. : 8,396,838 B2  
APPLICATION NO. : 12/876916  
DATED : March 12, 2013  
INVENTOR(S) : Brian Brockway et al.

Page 1 of 1

It is certified that error appears in the above-identified patent and that said Letters Patent is hereby corrected as shown below:

On Title Page, Item (75), under "Inventors", column 1, line 6, delete "Banglore" and insert -- Bangalore --, therefor.

In the Specification

In column 1, line 12, delete "SEARCHING" ," and insert -- SEARCHING", --, therefor.

In column 1, line 14, delete "8,140,789," and insert -- 8,140,786, --, therefor.

In column 1, line 16, delete "COPIES" ," and insert -- COPIES", --, therefor.

Signed and Sealed this  
Ninth Day of July, 2013

Teresa Stanek Rea  
*Acting Director of the United States Patent and Trademark Office*